(12) United States Patent
Totani et al.

(10) Patent No.: US 7,228,026 B2
(45) Date of Patent: Jun. 5, 2007

(54) OPTICAL MULTIPLEXER/DEMULTIPLEXER AND MANUFACTURING METHOD THEREOF

(75) Inventors: Hiromi Totani, Uji (JP); Hayami Hosokawa, Kyoto (JP)

(73) Assignee: Omron Corporation, Kyoto-shi (JP)

( * ) Notice: Subject to any disclaimer, the term of this patent is extended or adjusted under 35 U.S.C. 154(b) by 0 days.

(21) Appl. No.: 11/345,941

(22) Filed: Feb. 2, 2006

(65) Prior Publication Data

US 2006/0171630 A1 Aug. 3, 2006

(30) Foreign Application Priority Data

Feb. 2, 2005 (JP) .............................. 2005-026976

(51) Int. Cl.
*G02B 6/28* (2006.01)
*G02B 6/26* (2006.01)

(52) U.S. Cl. .......................................... 385/24; 385/19
(58) Field of Classification Search ................ 385/24, 385/19
See application file for complete search history.

(56) References Cited

U.S. PATENT DOCUMENTS

| | | | |
|---|---|---|---|
| 4,693,544 A | | 9/1987 | Yamasaki et al. |
| 5,144,498 A | * | 9/1992 | Vincent ....................... 359/885 |
| 5,234,772 A | | 8/1993 | Oguchi et al. |
| 5,332,535 A | | 7/1994 | Oguchi et al. |
| 5,479,547 A | * | 12/1995 | Kunikane et al. ............. 385/47 |
| 6,215,924 B1 | | 4/2001 | Hulse et al. |
| 6,295,393 B1 | * | 9/2001 | Naganuma ..................... 385/11 |

FOREIGN PATENT DOCUMENTS

| | | |
|---|---|---|
| EP | 1 014 125 A2 | 6/2000 |
| JP | 8-190026 | 7/1996 |
| JP | 2608633 | 2/1997 |
| JP | 10-123437 | 5/1998 |

OTHER PUBLICATIONS

Patent Abstracts of Japan 10123437.
Patent Abstracts of Japan 08190026.
European Search Report dated Apr. 20, 2006.

* cited by examiner

*Primary Examiner*—Michelle Connelly-Cushwa
*Assistant Examiner*—Kajli Prince
(74) *Attorney, Agent, or Firm*—Osha Liang LLP

(57) ABSTRACT

An optical multiplexer/demultiplexer and a manufacturing method thereof are disclosed, wherein a core is arranged on each side of a filter element, and the light is caused to enter the filter element from one of the cores without using a collimator lens. The loss of the transmitted light is reduced by optimizing the axial shift amount of the cores on the two sides. The optical axes of the cores 21, 23 located on both sides of the filter element 26 are displaced by δ. This axial shift amount δ is determined as $A(\lambda) \cdot T \cdot \tan \theta$, where $A(\lambda)$ is a predetermined coefficient depending on the wavelength of the incident light, θ the angle between the optical axis of the incident light and the normal to the entrance surface of the filter element, and T the thickness in terms of a medium depending on the refractive indexes of the high refractive index layer and the low refractive index layer making up a multilayer film of the filter element.

7 Claims, 28 Drawing Sheets

Fig. 28

|  | Axial shift | Transmission loss | | |
| --- | --- | --- | --- | --- |
|  |  | 1300nm | 1480nm | 1500nm |
| Prior art | d1 = −0.24 μm | 0.18 dB | 0.65 dB | 1.03 dB |
| Invention | d12−d11 = 1.15 μm | 0.45 dB | 0.43 dB | 0.74 dB |

OPTICAL MULTIPLEXER/DEMULTIPLEXER AND MANUFACTURING METHOD THEREOF

BACKGROUND OF THE INVENTION

1. Field of the Invention

The field of the current invention relates to optical communications and in particular to multiplexers/demultiplexers and their fabrication.

2. Description of the Related Art

The range of the use of optical communication has spread from trunk systems to metro systems and access systems in response to the recent demand for broadband services. In an access system in which subscribers are connected from a metro system, the wavelength multiplex system for the subscriber system has been introduced. In this wavelength multiplex system, an optical multiplexer/demultiplexer is required to multiplex and demultiplex the signal light.

FIG. 1 is a schematic diagram for explaining a conventional optical multiplexer/demultiplexer 208 using an optical fiber collimator. In FIG. 1, reference numerals 201, 202 designate optical fiber core wires of a 2-core optical fiber collimator 203, numeral 204 a collimator lens of the 2-core optical fiber collimator 203, numeral 205 a filter element, numeral 206 a focusing lens and numeral 107 an optical fiber core wire.

In the optical system of the optical multiplexer/demultiplexer shown in FIG. 1, the filter element 205 is arranged in the neighborhood of the focal point of the collimator lens 204. The light transmitted through and dispersed from the end surface of the optical fiber core wire 201 of the 2-core optical fiber collimator 203 is collimated by the collimator lens 204, and reflected on or transmitted through the filter element 205 arranged in the vicinity of the focal point of the collimator lens 204 in accordance with the wavelength thereof. The transmitted light is coupled to the optical fiber core wire 207 by the lens 206, and the reflected light, after being passed through the collimator lens 204 again, is collimated with the optical axis again and optically coupled to the other optical fiber core wire 202 of the 2-core optical fiber collimator 203. In the process, the accuracy of the position where the filter element 205 is located is estimated on the assumption that the numerical aperture (NA) of the optical fiber is 0.1, the center distance between the optical fiber core wire 201 and the optical fiber core wire 202 of the 2-core optical fiber collimator 204 is 125 μm and the focal length f of the collimator lens 204 is 1.8 mm. In the case where the error of the position of the filter element 205 is ±1 mm, the loss between the optical fiber core wires 201 and 202 is about 0.2 dB. This error is sufficiently small as compared with the thickness 10 to 20 μm of the portion of the filter element 205 other than the substrate. Therefore in an optical multiplexer/demultiplexer using a collimator lens, the positional accuracy of the filter element 205 has so far not been considered a problem. During production, the angle at which the filter element 205 is arranged has a larger effect on the reflection loss than the positional accuracy of the filter element 205.

With the spread of applications of the optical communication from the metro system to the access system, however, the optical multiplexer/demultiplexer in which the light emitted from the optical waveguide or the optical fiber enters the filter element without using a collimator lens has become increasingly important to reduce the cost and size of the system. In this optical multiplexer/demultiplexer, the light cannot be collimated by the collimator lens, and therefore a filter element is required to be arranged as near to the end surface of the optical fiber core wire as possible. For this reason, the filter element is required to be thin and generally formed of a fluoride polyimide filter (hereinafter referred to as the polyimide filter element) with a dielectric multilayer film for the filter arranged on the substrate of a polyimide fluoride film. An example of the features and the fabrication method of a fluoride polyimide filter element is described in detail in Japanese Unexamined Patent Publication No. 4-211203 (Patent No. 2608633) (hereinafter referred to as JP2608633). Further, optical multiplexer/demultiplexers used in the trunk system and the metro system are required to have high performance due to the narrow wavelength intervals involved.

FIG. 2 is a sectional view for explaining the optical multiplexer/demultiplexer 210 using no collimator lens. In FIG. 2, numerals 211, 212, 216 designate the cores of the optical waveguide, numerals 211a, 212a, 216a the center lines of the cores 211, 212, 216, respectively, numeral 213 a polyimide filter element using a polyimide fluoride film, numeral 213a a multilayer film having the filter function of the polyimide filter element 213, numeral 213b a substrate formed of a polyimide fluoride film, numeral 214 the surface of the multilayer film as an entrance surface of the optical multiplexer/demultiplexer 210, and numeral 217 an adhesive.

The polyimide filter element (polyimide fluoride filter) is described in detail in JP2608633, for example, and therefore not described in detail herein. The polyimide filter element is formed in such a manner that a provisional substrate of a material such as optical glass is formed with a polyimide fluoride film (5 μm thick, for example) having a comparatively small thermal expansion characteristic, on which a dielectric multilayer film is formed, after which the polyimide fluoride film, together with the dielectric multilayer film formed thereon, is separated from the provisional substrate thereby to produce the polyimide filter element having the polyimide fluoride film as a substrate. The whole of this polyimide filter element including the substrate, which can be reduced greatly in thickness and which can be bonded on the cut surface of an optical waveguide to form an optical multiplexer/demultiplexer, is expected to provide a promising optical part.

As an example of an optical waveguide with a filter, an optical waveguide using a wavelength select filter is described in "Polymer Optical Waveguide Design Architecture" co-authored by Hiroshi Masuda, Satoaki Shibata, Tatemi Ido and Makoto Takahasi, Hitachi Chemical Technical Report No. 39, pp. 37 to 40, published July 2002 (hereinafter referred to as the Masuda document). FIGS. 3 and 4 show an optical multiplexer/demultiplexer with a wavelength select filter inserted in the conventional optical waveguide described in the Masuda document. FIG. 3 shows an optical waveguide 230 in which a LPF (long-pass filter) 231 for reflecting the light of 1300 nm in wavelength and transmitting the light of 1550 nm in wavelength is used as a wavelength select filter. In FIG. 3, numerals 232 to 234 designate arrows for explaining the core of the optical waveguide 230 and numerals 235 to 238 the progression of the light. Also, FIG. 4 shows an optical waveguide 250 in which a SPF (short-pass filter) 251 for transmitting the light of 1300 nm in wavelength and reflecting the light of 1550 nm in wavelength is used as a wavelength select filter. In FIG. 4, numerals 252 to 254 designate the cores of the optical waveguide 250, and numerals 255 to 258 arrows for explaining the progression of light.

In the optical waveguide 230 shown in FIG. 3 using the LPF 231, the light having the wavelength of 1300 nm proceeding in the direction of arrow 235 through the core 232 is reflected on the LPF 231 and proceeds in the direction of arrow 236 through the core 233. Also, the light having the wavelength of 1550 nm proceeding in the direction of arrow 237 through the core 233 is transmitted through the LPF 231 and proceeds in the direction of arrow 238 through the core 234.

In the optical waveguide 250 shown in FIG. 4 using the LPF 251, on the other hand, the light having the wavelength of 1550 nm proceeding in the direction of arrow 255 through the core 252 is reflected on the SPF 251 and proceeds in the direction of arrow 256 through the core 253. Also, the light having the wavelength of 1300 nm proceeding in the direction of arrow 257 through the core 253 is transmitted through the SPF 251 and proceeds in the direction of arrow 258 through the core 254.

The filters used in the optical waveguide 230 shown in FIG. 3 and the optical waveguide 250 shown in FIG. 4 are each configured using a filter element (polyimide filter element) including a polyimide fluoride film as a substrate and having a thickness of 14 to 16 µm. In designing the optical waveguide, care is taken to offset the cores on both sides of the filter element taking the refractive index of the filter element into consideration. The Masuda document explains that the optical paths are offset as a condition to improve the performance of the optical multiplexer/demultiplexer, although the specifics of the offset are not described. Thus as an example, the offset by the refraction of light according to Snell's law is described below.

The shift, i.e. the offset of the optical path due to the change in refractive index is explained with reference to FIG. 5. FIG. 5 is an enlarged sectional view showing the polyimide filter element 530 inserted in the filter insertion section of the optical waveguide shown in FIGS. 3, 4. This polyimide filter element 530 (i.e. the LPF 231 or the SPF 251) is formed as a dielectric multilayer film including, alternately stacked, a layer having a thickness substantially equal to one fourth of the design reference wavelength with a comparatively high refractive index (hereinafter referred to as the high refractive index layer H) and a layer having a thickness substantially equal to one fourth of the design reference wavelength with a comparatively low refractive index (hereinafter referred to as the low refractive index layer L). The polyimide filter element 530 is actually formed by stacking the low refractive index layers L and the high refractive index layers H alternately on the substrate 533. However, for the convenience of explaining the offset of the light path and the behavior of the light in the polyimide filter element 530, the entire assembly of high refractive index layers H and of low refractive index layers L is illustrated as a separate and single layer designated in FIG. 5 by numerals 531 and 532, respectively. In FIG. 5, numeral 536 designates the incident light, numerals 537 to 540 the light paths of the incident light 536 entering and leaving the polyimide filter element 530, and numeral 536a a dotted line showing the extension of the incident light 536. Numeral 550 designates the entrance point of the incident light 536, numeral 535 the normal to the entrance surface 545 at the entrance point 550, character θ1 the angle between the incident light 536 and the normal 535, and characters θ2 to θ5 the angles that the light paths 537 to 540, respectively, form with the normal 535. Numeral 546 designates the exit surface of the light transmitted through the polyimide filter element 530, numeral 551 the exit point of the exit light, and numeral 552 an intersection between the dotted line 536a and the exit surface 546. Also, reference character d1 designates the distance between the exit point 551, at which the incident light 536 entering the polyimide filter element 530 from the entrance surface 545, and after refraction and proceeding through the filter element 530 exits from the exit surface 546 of the filter element 530 on the one hand and the intersection 552 between the exit surface 546 and the dotted line 536a on the other hand.

In the case where the polyimide filter element 530 is located in the optical waveguide shown in FIG. 5, according to Snell's law, the incident light 536 proceeds in the direction of arrow 547 and enters the polyimide filter element 530 at the entrance point 550, and while being refracted by the whole high refractive index layers H making up the filter element 530 then proceeds to the light path 537. The resulting light further proceeds to the light path 538, and while being refracted by the whole low refractive index layers L making the filter element 530, proceeds to the light path 539, exits from the exit point 551 of the exit surface 546 and proceeds in the direction of arrow 548 along the light path 540. On the other hand, assuming that the polyimide filter element 530 is absent, the incident light 536 proceeds linearly along the dotted line 536a, and from the intersection 552 between the dotted line 536a and the exit surface 546, exits in the direction of arrow 548. As a result, by inserting the polyimide filter element 530 in the optical waveguide, the exit point of the exit light 540 is shifted by the distance d1 on the exit surface 546. This is the offset of the light path caused by the change in the refractive index according to Snell's law.

By designing an optical multiplexer/demultiplexer having a filter element taking this offset of the light path into consideration, the loss of the light transmitted through the filter element can probably be reduced.

Nevertheless, the result of vigorous study made by the present inventor shows that the loss of the transmitted light cannot be sufficiently reduced nor can the problem of large variation in the loss of the transmitted light be solved by simply taking into consideration the light path offset due to refraction.

SUMMARY OF THE INVENTION

The above-mentioned problems have not been sufficiently addressed in prior art. Thus, an optical multiplexer/demultiplexer device in which, without using a collimator, the loss of signal light transmitted through the filter as well as large variations in the loss are minimized and several methods of manufacture, are herein described.

In particular, in some embodiments, the invention relates to an optical multiplexer/demultiplexer having one or more photoconductors arranged on the sides of a filter element, wherein the photoconductors are arranged such that the multiple reflections and refractions within the filter element determined by the coefficient A(λ) and the axial shift amount between the photoconductors are taken into account, thereby reducing the loss of light propagating through the filter element. Incorporating multiple optical waveguides and accommodation for an optical multiplexer/demultiplexer for a plurality of wavelengths and the fabrication thereof are also discussed.

Further features of the invention, its nature and advantages will become more apparent from the accompanying drawings and the various embodiments discussed in detail below.

BRIEF DESCRIPTION OF THE DRAWINGS

FIG. 28 shows a diagram showing a comparison of the transmission loss between the optical waveguide according to an embodiment of the invention and a conventional optical waveguide.

DETAILED DESCRIPTION OF THE INVENTION

Various embodiments of the present invention are explained in detail below with reference to the drawings. In the description that follows, a core is used merely as an example of a photoconductor, therefore it should not be construed that embodiments within the scope of the invention are limited to using cores.

Figure 6:
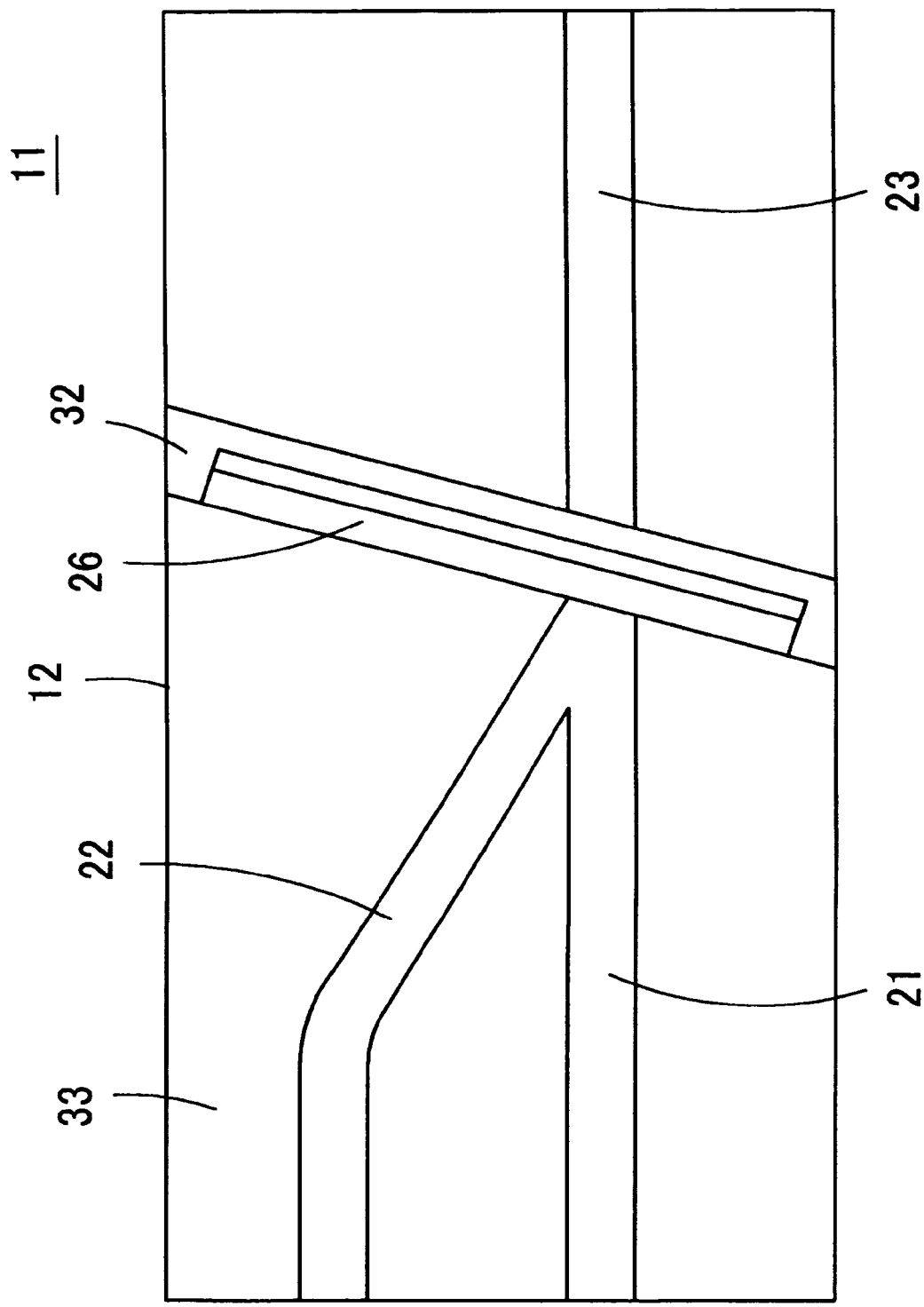
FIG. 6 shows a plan view schematically showing an embodiment of the optical multiplexer/demultiplexer according to this invention.

FIG. 6 is a plan view schematically showing an optical multiplexer/demultiplexer 11 according to an embodiment of the present invention. The optical multiplexer/demultiplexer 11 includes an optical waveguide 12 and a filter element 26. The optical waveguide 12 has a plurality of cores 21, 22, 23 formed of a transparent resin material, and the cores 21 to 23 are buried in a clad 33 of a transparent resin material lower in refractive index than the cores 21 to 23. The optical waveguide 12 is formed with a filter insertion section 32 by being grooved or halved, and the filter element 26 is inserted in the filter insertion section 32. The cores 21, 22 and the core 23 are arranged so as to be opposed to each other with the filter insertion section 32 therebetween. The cores 21 and 23 are linearly formed and substantially aligned with each other, and the end surfaces thereof are opposed to each other with the filter insertion section 32 therebetween. The end portion of the core 22 far from the filter insertion section 32 is linearly formed in parallel to the core 21, and the core 22 is curved at the intermediate portion thereof, so that the end portion thereof near to the filter insertion section 32 is integrally connected with the core 21.

Figure 7:
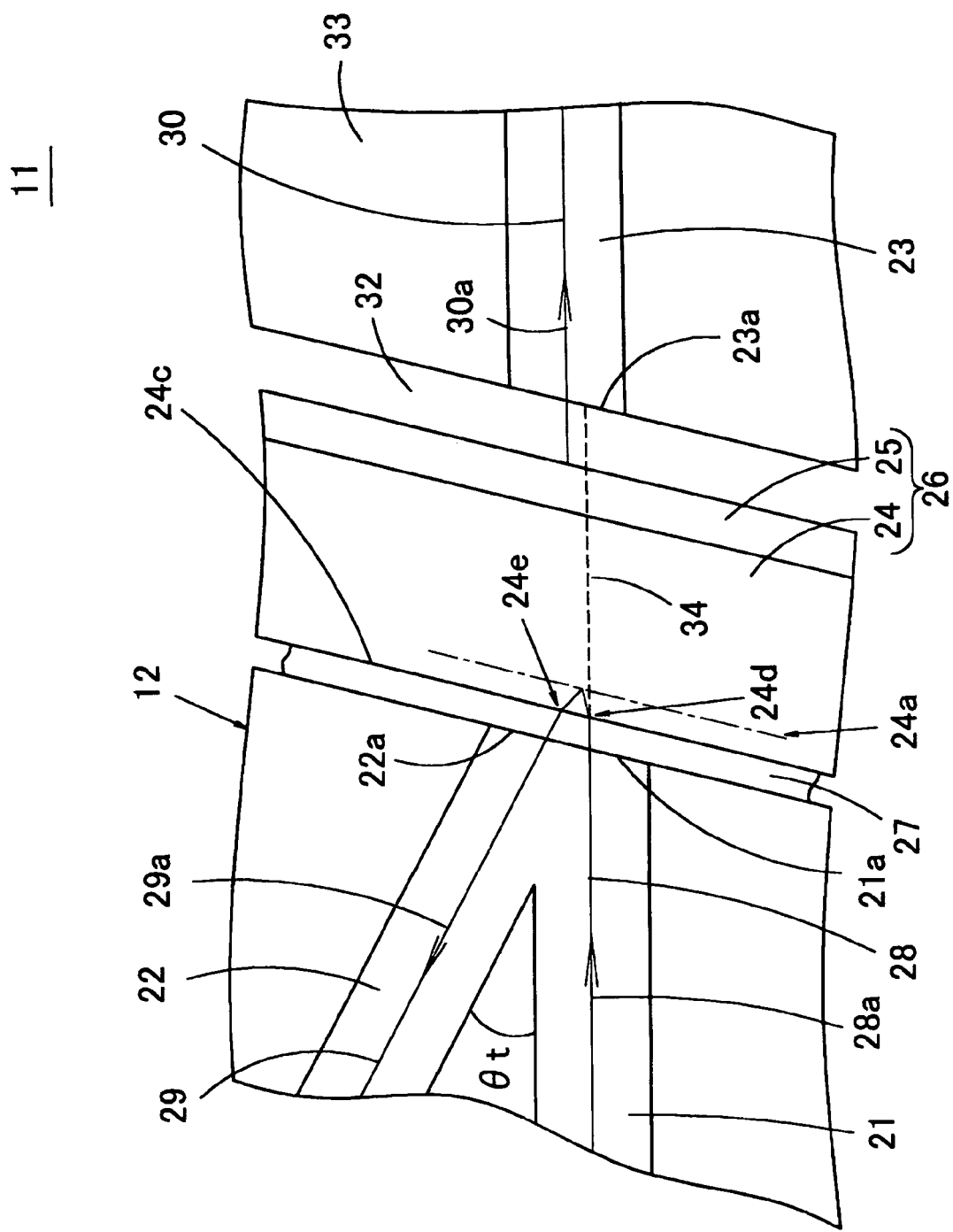
FIG. 7 shows an enlarged view showing a part of the optical multiplexer/demultiplexer of FIG. 6.

FIG. 7 is a sectional view showing, in enlarged form, the neighborhood of the filter element 26 of the optical multiplexer/demultiplexer 11. The end surface 21a of the core 21, the end surface 22a of the core 22 and the end surface 23a of the core 23 are exposed in the filter insertion section 32. The end portions of the cores 21 and 22 are integrally connected to each other at a position facing the core insertion section 32, and an angle of θt is formed by the cores 21 and 22 at the end of the core 23 nearer to the filter insertion section 32. Also, the end portion of the core 23 near to the filter insertion section 32 and the end portion of the core 21 near to the filter insertion section 32 are opposed to each other with the filter insertion section 32 therebetween, and the optical axis of the end portion of the core 23 is parallel to that of the end portion of the core 21. Nevertheless, the two optical axes are somewhat shifted from each other as described later.

The angle θt between the end portions of the cores 21, 22 is equal to the angle between the optical axes of the cores 21, 22 except that the angle delicately changes at the portion where the cores 21, 22 approach each other. In the description that follows, the wording "the optical axes of the cores 21, 22" in the neighborhood of the filter insertion section 32, unless otherwise specified, indicates the typical optical axes free of the delicate change at the portion where the cores 21, 22 approach each other or the optical axes of the incident and exit beams described later. Also, according to this embodiment, two cores are arranged on one side of the filter insertion section, and one core on the other side thereof.

Generally, however, at least one core is arranged in one of the filter insertion gaps and at least one core in the other gap.

The filter element 26 is a dielectric multilayer film 24 (polyimide fluoride filter) formed by, for example, the ion-assisted vapor deposition on a substrate 25 made of a polyimide fluoride film. The filter element 26 is accommodated in the filter insertion section 32 of the optical waveguide in such a manner as to partition the cores 21, 22 and the core 23, and fixed by adhesive 27 to the end surfaces 21*a*, 22*a* of the cores 21, 22. As an alternative, the filter element 26 may be fixed by adhesive 27 to the end surface 23*a* of the core 23. Once the filter element 26 is fixed to the end surface 23*a* of the core 23, the side of the filter element 26 near to the substrate is bonded. At the time of adjusting the arrangement in the fabrication process, therefore, the reflective position can be also adjusted, thereby making it possible to reduce the loss and variation of the reflected light further. A collimator lens for collimating the light onto the filter element 26 is not used.

In FIG. 7, numerals 28 to 30 designate the center lines of the cores 21 to 23, respectively, of the optical waveguide. Numerals 28*a*, 29*a* designate arrows indicating the direction in which the signal light proceeds. Numeral 24*a* designates a plane (hereinafter referred to as the effective reflection surface) parallel to the surface of the filter element 26 containing the physical reflection point (the point of center of gravity considering the refraction and reflection by each single stack layer making up the multilayer film 24) of the light having the wavelength λa as a first specified wavelength from the core 21 (or the core 22), incident to the filter element 26 and reflected in the direction toward the core 22 (core 21). Numeral 24*c* designates both the surface of the multilayer film 24 and one entrance surface of the filter element 26 at the same time. Numeral 24*d* designates the entrance point of the light proceeding through the core 21 and incident to the filter element 26 (which may alternatively be called the exit point of the light proceeding through the core 21 and reflected on the multilayer film 24). Numeral 24*e* designates the exit point of the light proceeding through the core 21 and incident to the filter element 26, reflected on the filter element 26 and exiting from the entrance surface 24*c* (which may alternatively be called the entrance point of the light proceeding through the core 22 and entering the filter element 26).

In the case where the characteristics of the filter element 26 used with this optical multiplexer/demultiplexer 11 are such that light having a wavelength of 1300 nm is reflected and light having a wavelength of 1550 nm is transmitted, the light having a wavelength of 1300 nm proceeding in the direction opposite to the arrow 29*a* through the core 22 is reflected onto the filter element 26 and proceeds in the direction opposite to the arrow 28*a* through the core 21. Also, light having a wavelength of 1550 nm proceeding in the direction of the arrow 28*a* through the core 21 is transmitted through the filter element 26 and proceeds in the direction of the arrow 30*a* through the core 23.

During the process, light entering the filter element 26 from the core 22, reflected on the filter element 26 and entering the core 21 is not reflected onto the surface 24*c* of the filter element 26, and the light that has entered the filter element 26 is reflected on the effective reflection surface 24*a*.

Next, the minimization of the loss of the light transmitted through the filter element 26 is discussed. Similar to the conventional optical waveguide using the filter element, as explained with reference to FIG. 5, the offset is taken into consideration. On one hand, this alone cannot truly reduce the loss of the transmitted light and on the other hand being large in variations, the practical application of a compact optical multiplexer/demultiplexer that has low production cost is difficult. The inventor of the present invention proposes several method effectively reducing the loss of the transmitted light of the optical multiplexer/demultiplexer by use of the filter element controlled in such a manner as to limit the emission point of the transmitted light of the filter element to a narrow range corresponding to the wavelength of the transmitted light.

Figure 1:
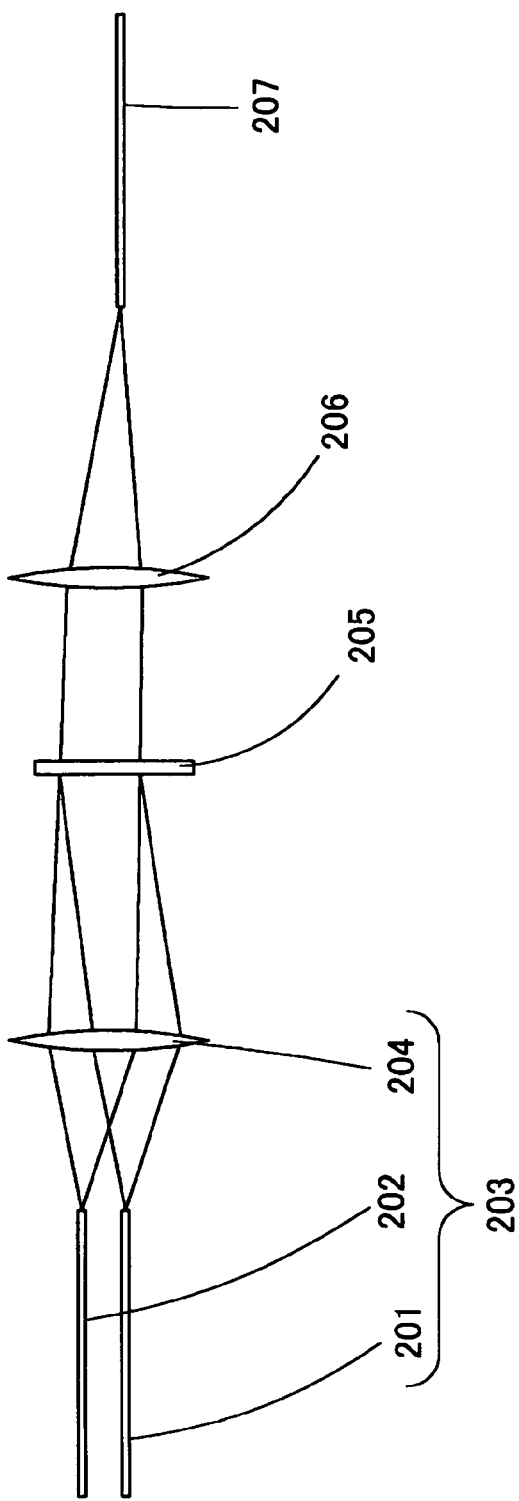
FIG. 1 shows a schematic diagram for explaining a conventional optical multiplexer/demultiplexer using a collimator lens.
Figure 2:
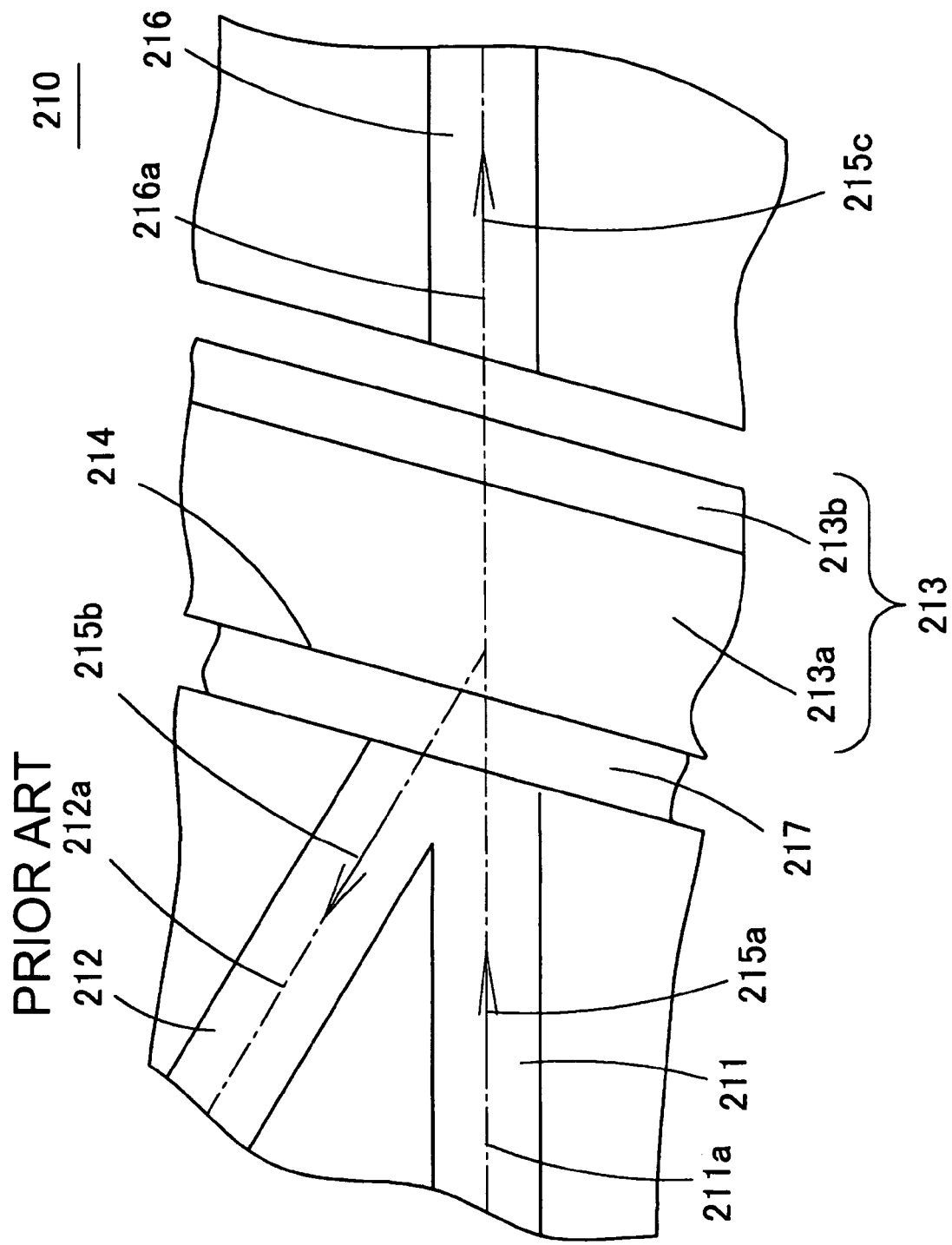
FIG. 2 shows a diagram for explaining a conventional optical multiplexer/demultiplexer not using a collimator lens.
Figure 3:
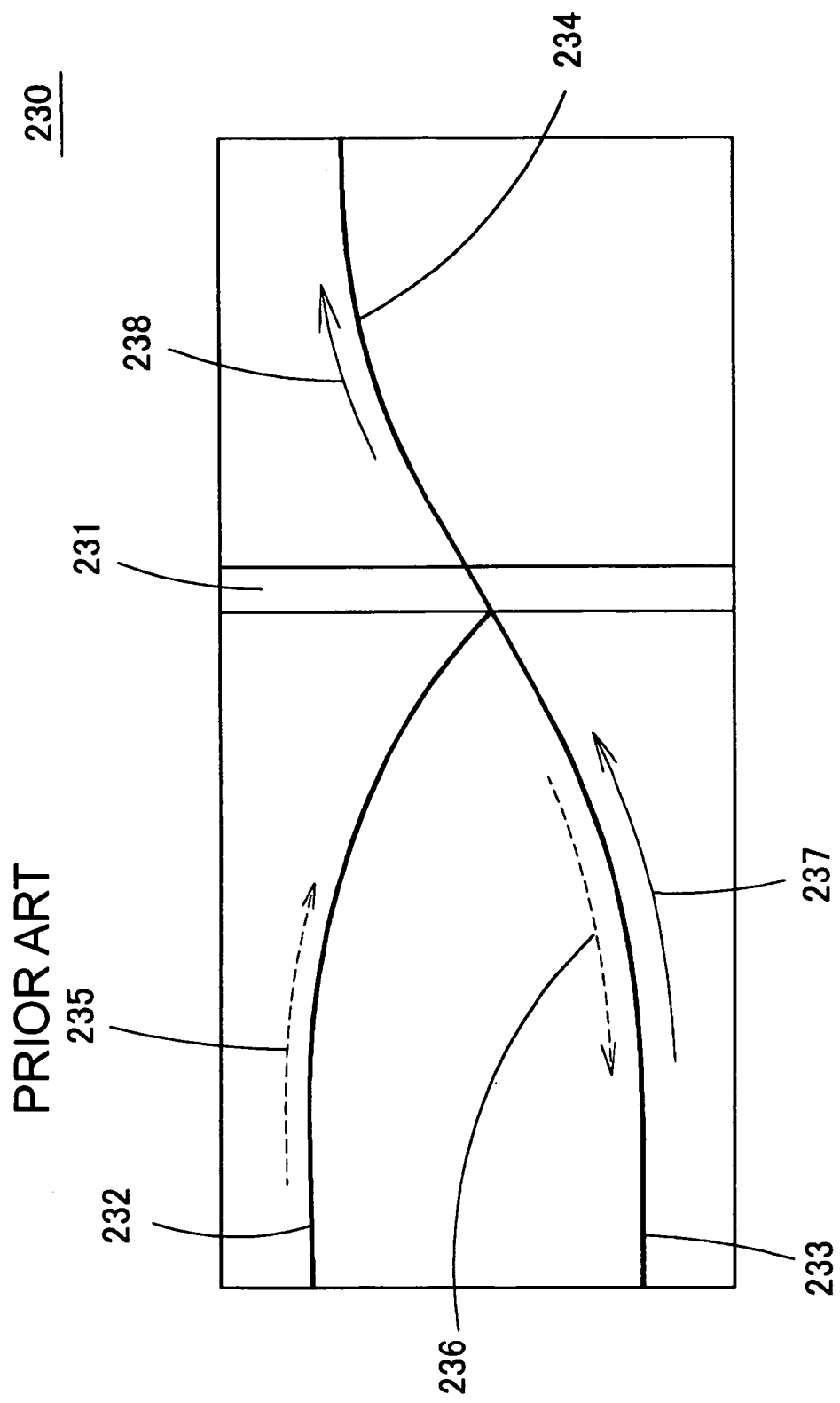
FIG. 3 shows a diagram for explaining a conventional optical multiplexer/demultiplexer described in the Masuda document.
Figure 4:
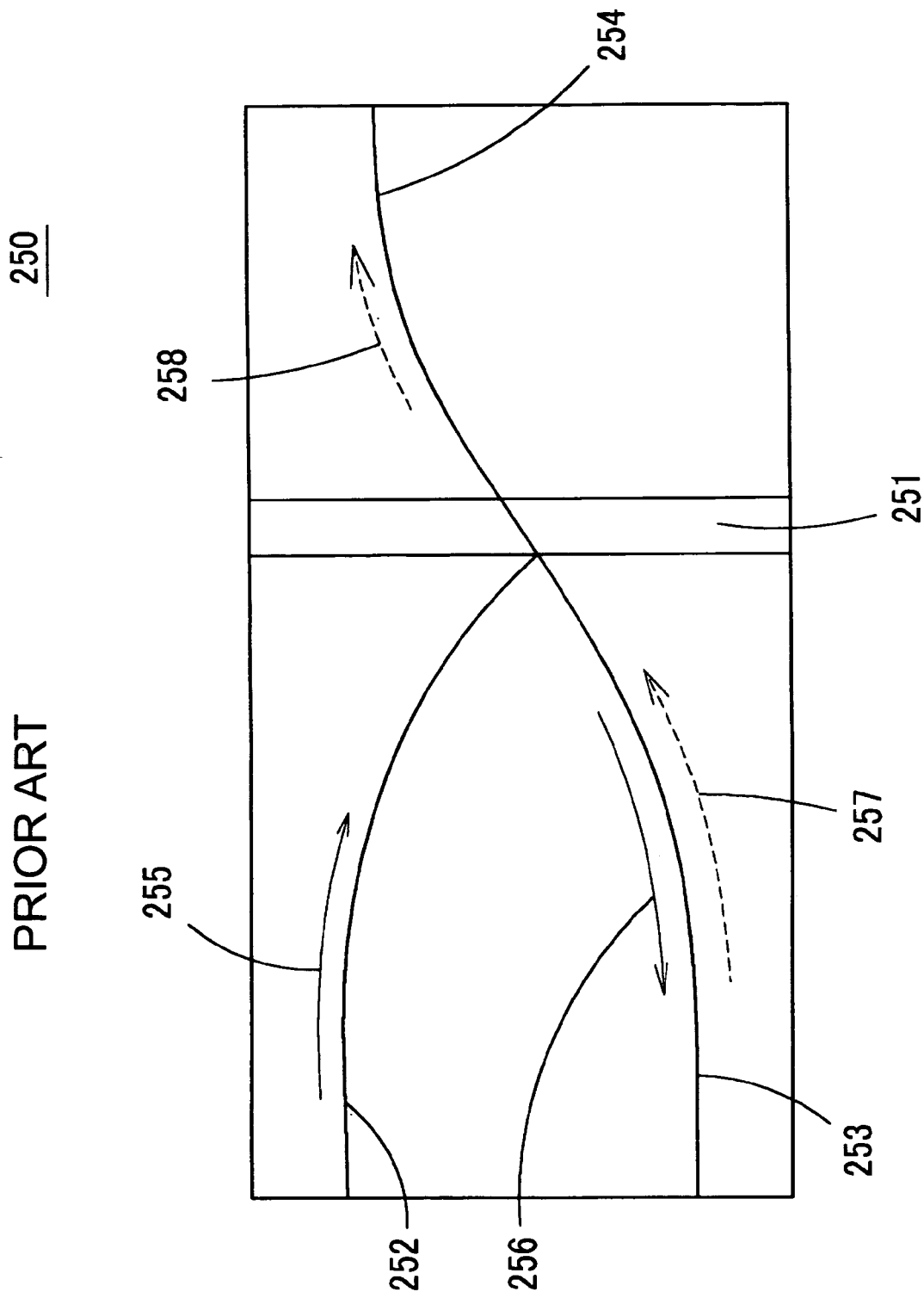
FIG. 4 shows a diagram for explaining the conventional optical multiplexer/demultiplexer described in the Masuda document.
Figure 5:
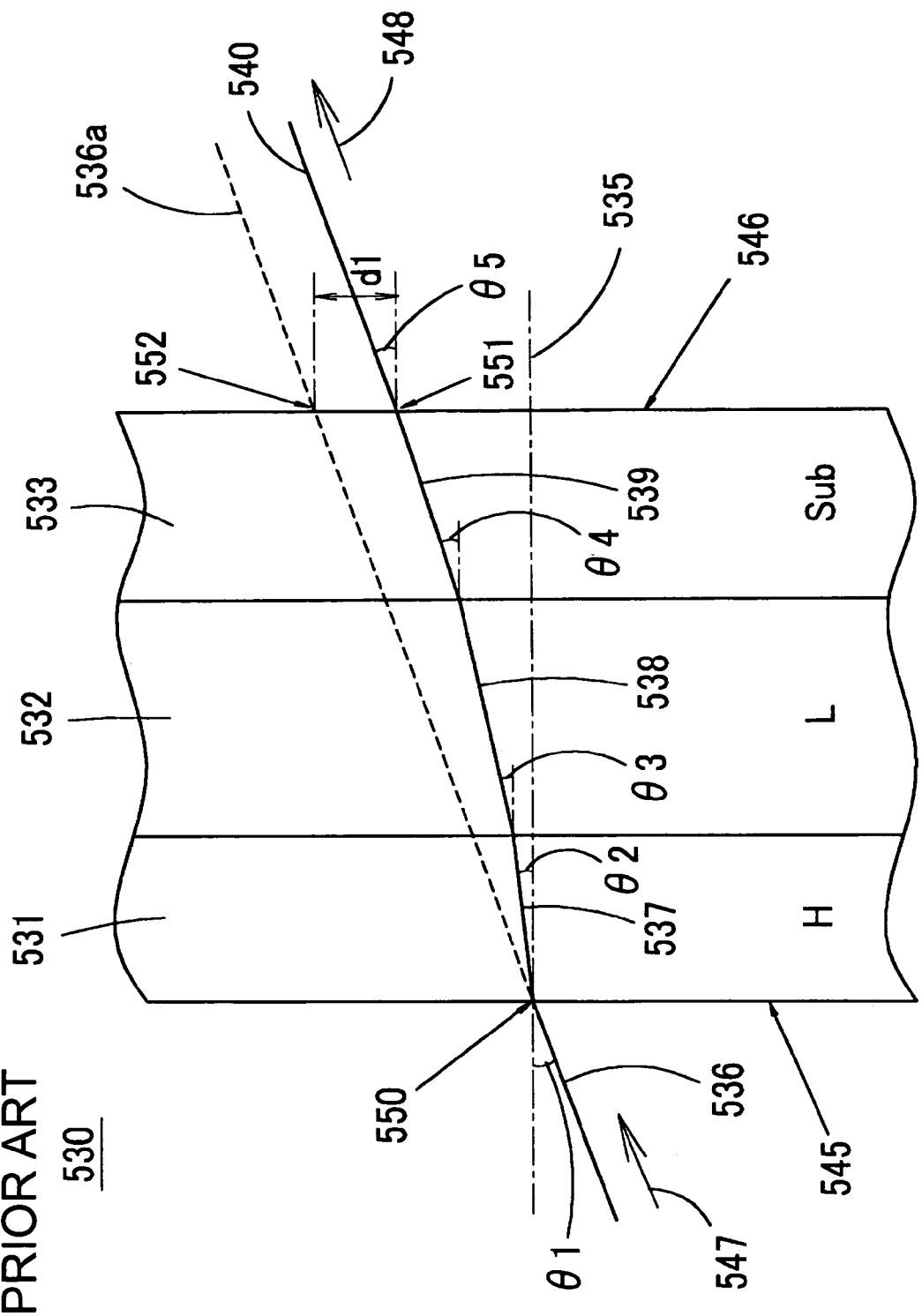
FIG. 5 shows a diagram for explaining the offset in the optical waveguide into which the conventional filter element is inserted.
Figure 8:
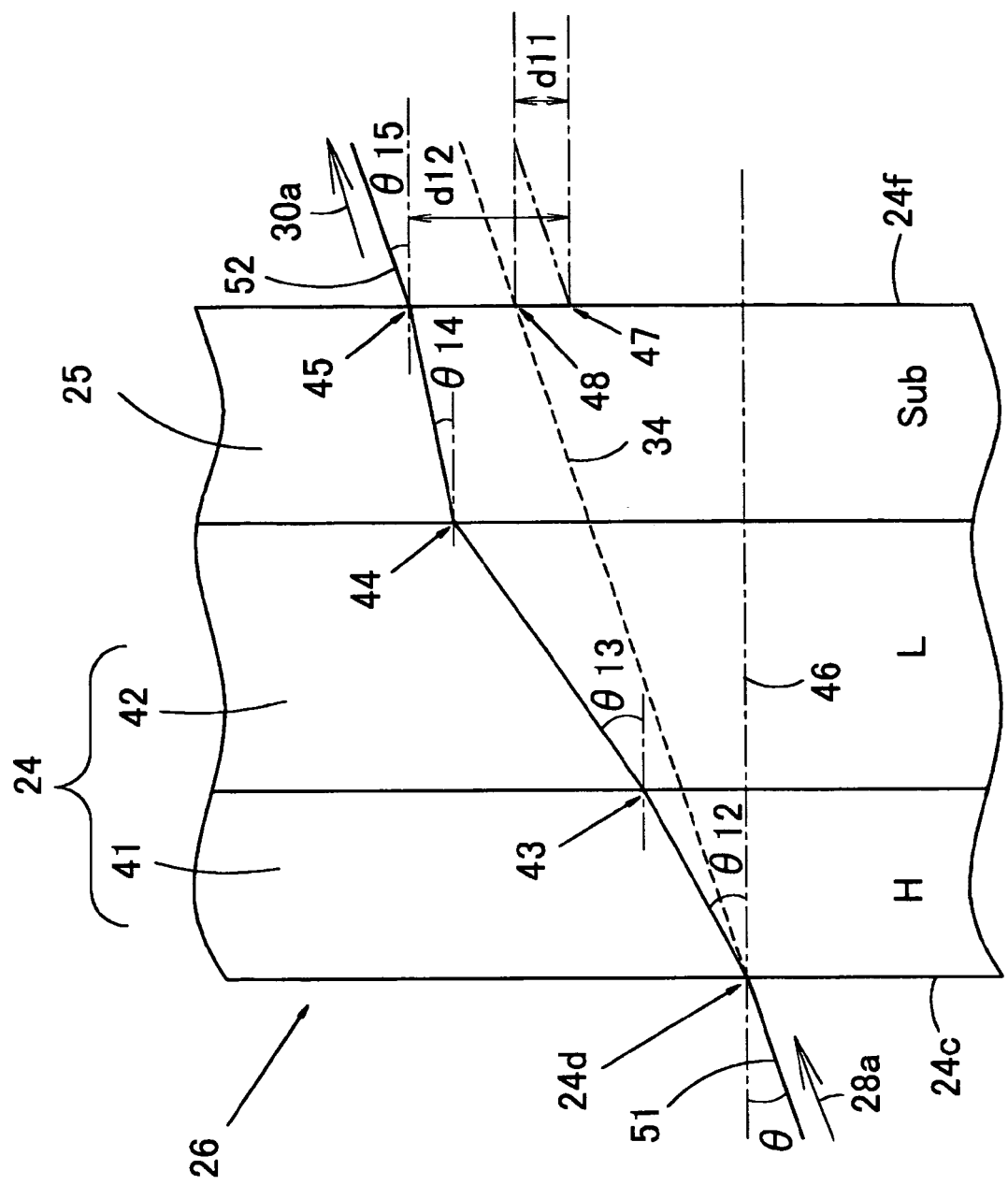
FIG. 8 shows a diagram for explaining the behavior of the light transmitted through the filter element.

Next, a method of reducing the loss of the transmitted light in the filter element is explained. FIG. 8 is a schematic diagram for explaining this method. The filter element 26 includes a dielectric multilayer film 24 formed by alternately stacking a layer (high refractive index layer H) having a thickness about one fourth of the filter design wavelength and comparatively high in refractive index and a layer (low refractive index layer) comparatively low in refractive index, which dielectric multilayer film 24 is arranged on the surface of the substrate 25. In FIG. 8, the entrance surface 24*c* and the exit surface 24*f* of the transmitted light are displayed as they are, and the multilayer film 24 is divided into a mass 41 plotted with only the high refractive index layers H between the entrance surface 24*c* and the substrate 25 and a mass 42 plotted with only the low refractive index layers L. Also, numeral 51 designates the light incident to the filter element 26, numeral 46 the normal to the entrance surface 24*c* at the point, i.e. the entrance point 24*d* where the incident light 51 enters the filter element 26, and numeral 24*d* the entrance point of the incident light 51 to the entrance surface 24*c*. Numerals 43 to 45 designate the positions for explaining the light path of the incident light 51 entering the filter element 26, of which numeral 45 designates an exit point. Numeral 34 designates a dashed line indicating the direction in which the incident light 51 extends, and corresponding to the path of the incident light 51 in the absence of the filter element 26. Numerals θ and θ12 to θ15 designate the angles between the normal 46 and the line segments sequentially connecting the positions 43 to 45 for explaining the entrance point 24*d* of the incident light 51 to the filter element 26 and the light path of the incident light 51 that has entered the filter element 26. Also, numeral d11 designates the distance from the intersection between the exit surface 24*f* and the dashed line 34 and the virtual exit point 47 based on the assumption that the incident light 51 entering the filter element 26 is refracted in the filter element 26 while being offset in accordance with as shown in FIG. 5, proceeds in the filter element 26 and exits from the exit surface 24*f* of the filter element 26. Numeral d12 designates the distance between the exit point 45 and the virtual exit point 47 of the light 51 entering the filter element 26 from the entrance point 24*d* of the entrance surface 24*c* and leaving the exit surface 24*f* as the exit light 52. Numeral 48 designates the intersection between the dashed line 34 and the exit surface 24*f*.

The filter element 26 is actually formed by stacking the low refractive index layer L and the high refractive index layer H alternately on the substrate 25. In FIG. 8, however, for the convenience of explaining the offset concept on the one hand and for the convenience of explaining the exit point of the transmitted light in the current embodiment on the other hand, the high refractive index layers H are designated collectively as a mass 41 and the low refractive index layers L as a mass 42 to facilitate the understanding of the progression by refraction of the incident light 51 through the filter element 26.

In FIG. 8, the incident light 51 proceeding in the direction of arrow 28*a* enters the filter element 26 by way of the entrance point 24*d* of the entrance surface 24*c*. In accordance with the concept of offset based on Snell's law, this incident light exits from the virtual exit point 47 of the exit surface 24*f* by the refraction phenomenon including the refraction by the whole 41 of the high refractive index layers H making up the filter element 26, the refraction by the whole 42 of the low refractive index layers L making up the filter element 26 and the refraction by the substrate 25. In the current embodiment, however, the result of multiple reflection in the filter element 26 as well as the offset based on Snell's law are taken into consideration, so that the incident light 51 proceeding in the direction of arrow 28*a* in FIG. 8 enters the filter element 26 from the entrance point 24*d* of the entrance surface 24*c*, after which the light exits in the direction of arrow 30*a* by way of the exit point 45 distant by d12 from the virtual exit point 47 of the exit surface 24*f* toward the intersection 48 between the dashed line 34 and the exit surface 24*f*.

Figure 9:
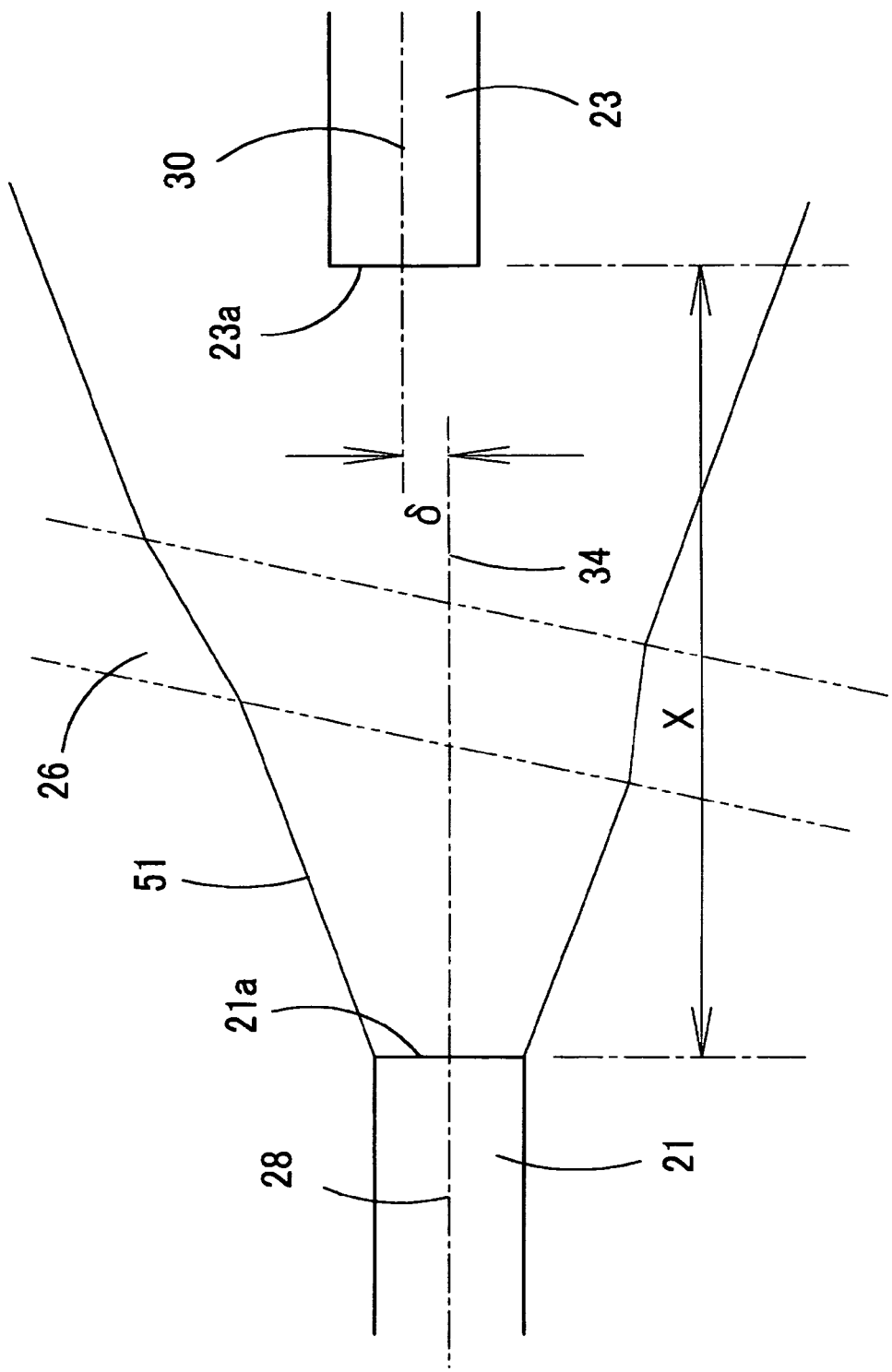
FIG. 9 shows a diagram for explaining the distance between openings and the axial shift amount of the optical multiplexer/demultiplexer.

In the optical waveguide 12 according to the invention shown in FIGS. 6, 7, therefore, as shown in FIG. 7, the axial shift amount δ is maintained between the optical axes of the cores 21, 23 as shown in FIG. 9 in such a manner that the center line 30 (optical axis) of the core 23 of the optical waveguide 12 coincides with the optical path of the exit light 52 leaving the position of the exit point 45 in FIG. 8 on the one hand and the exit light 52 can be received taking the progression of the exit light 52 due to the effect of the refractive index of the medium of the end surface of the core 23 and the exit surface 24*f* on the other hand. Thus, the loss of the transmitted light can be reduced.

Figure 10:
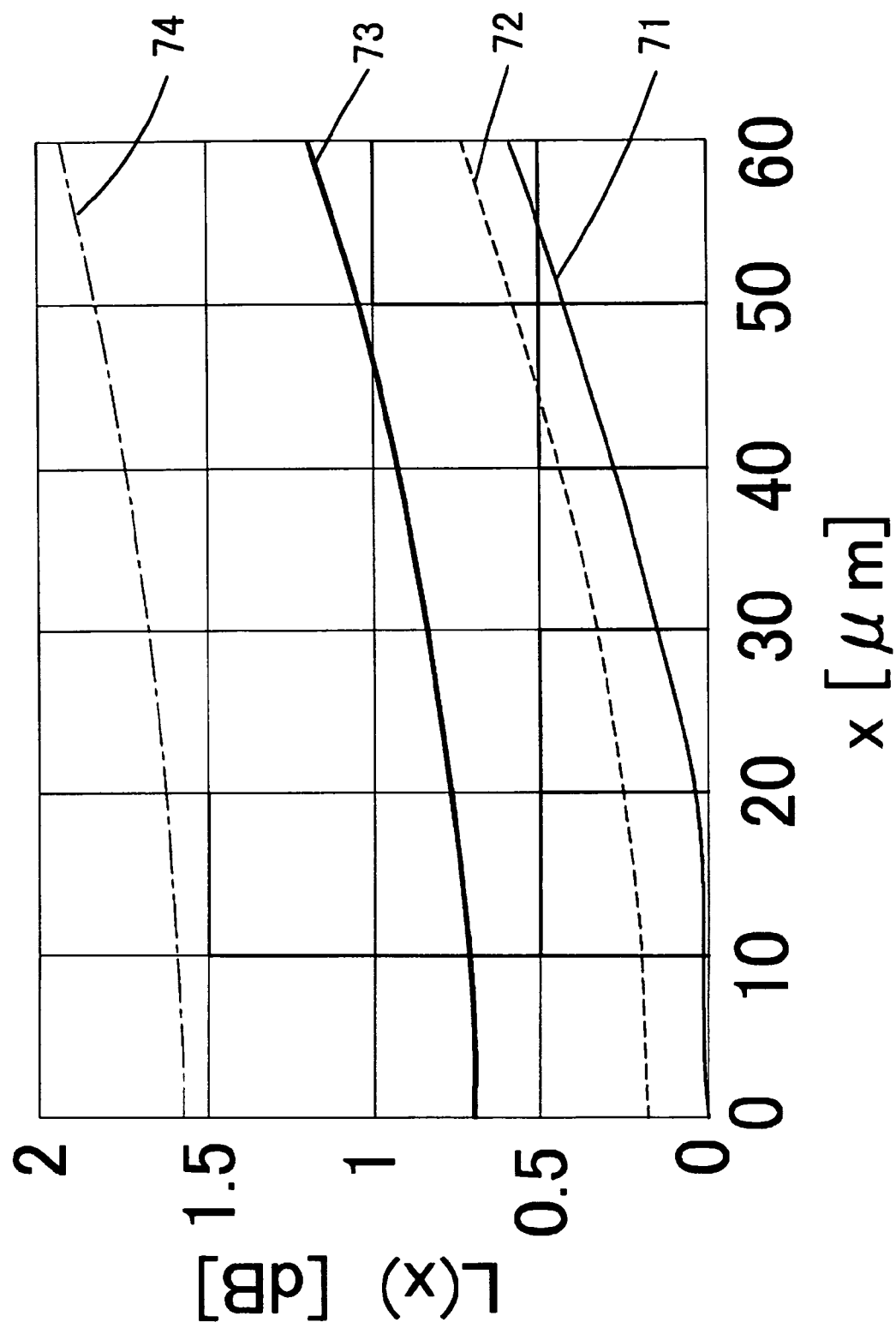
FIG. 10 shows a diagram for explaining the coupling loss with regard to the axial shift and the distance between the opposed openings of two photoconductors.

FIGS. 9, 10 are diagrams for explaining the method of determining the axial shift amount δ of the cores 21, 23, i.e. the coupling loss for the axial shift amount δ of the core and the inter-core distance x with two opening ends of the two cores having a given numerical aperture NA are opposed to each other. This assumes that the two opposed cores near the end surfaces thereof are linear.

In FIG. 9, numerals 21, 23 designate cores, numeral 28 the center line (optical axis) of the core 21, and numeral 30 the center line (optical axis) of the core 23. Character δ designates the axial shift amount between the center line 28 of the core 21 and the center line 30 of the core 23, and character x the distance (inter-end distance) between the end surface 21*a* of the core 21 and the end surface 23*a* of the core 23. Also, curves 71 to 74 shown in FIG. 10 represent the coupling loss of the system shown in FIG. 9, in which the abscissa is the inter-end distance x of the cores 21, 23 and the ordinate the coupling loss L(x)

In the case where the filter insertion section 32 for inserting the filter element tilted with respect to the optical path is arranged between the end surfaces of the cores 21 to 23, the filter insertion section 32 is often formed by obliquely cutting the end surfaces of the cores 21 to 23. In this case, as long as the refractive index of the cores 21 to 23 is coincident with that of the adhesive 27 for bonding the filter element 26, the optical axis of the light emitted from the end surface of the core 21 is coincident with the optical axis of the core 23. Nevertheless, the refractive index of the core 21 and that of the medium of the adhesive 27 are generally different from each other. For example, the refractive index of the core 21 using quartz is about 1.46, while the refractive index thereof formed of plastics is about 1.5. Thus, the refractive index of the core is different depending on the material. In the case where the refractive index of the core 21, etc. is different from that of the medium of the adhesive 27, the optical axis of the core 23 on the exit side of the filter element 26 fails to strictly coincide with that of the exit light. This is also the case with the optical axis of the core 21 in the entrance side of the filter element 26. In other words, the axial shift amount δ as stated herein indicates the shift amount between the exit light and the incident light at the core end surface.

The coupling loss curves shown in FIG. 10 are calculated on the assumption that the wavelength of the light coupled by the system shown in FIG. 9 is 1550 nm, the numerical aperture NA of the core end surface is 0.1 and the refractive index of the medium between the two end surfaces is 1.56. The curve 71 is associated with the axial shift amount δ of 0 μm, the curve 72 associated with the axial shift amount δ of 1 μm, the curve 73 associated with the axial shift amount δ of 2 μm, and the curve 74 associated with the axial shift amount δ of 3 μm.

As understood from the graph shown in FIG. 10, the coupling loss L(x) is a function of both the inter-end distance x and the axial shift amount δ and and changes with parameter 6 are much larger than that with the variable x. Therefore, in a conventional optical multiplexer/demultiplexer using the filter element such as a wavelength select element between the end surfaces of the cores, the polyimide fluoride filter capable of reducing the thickness of the filter element is used mainly to reduce the coupling loss and thus reduce the inter-end distance x. Taking the result of FIG. 10 into consideration, however, it is seen that the axial shift amount δ should be considered more important to reduce the coupling loss L(x).

Based on these basic concepts, various studies were made regarding the filter element actually used with optical multiplexer/demultiplexers and optical coupling systems including the filter element. As a result, the inventor has discovered that as far as the optical multiplexer/demultiplexer in which the filter element tilted with respect to the optical axes of at least two opposed cores is inserted between the end surfaces of the opposed cores, an inexpensive optical multiplexer/demultiplexer having a superior loss characteristic and a superior PDL characteristic can be provided by arranging the opposed cores having the axial shift amount δ between the optical axes of the light leaving the end surface of one of the opposed cores and the optical axis of the light entering the end surface of the other core. δ is expressed as:

$$\delta = A(\lambda) \cdot T \cdot \tan\theta$$

In this equation, the thickness T of the filter element in terms of the medium is defined as:

$$T = t(H) \cdot n(0)/n(H) + t(L) \cdot n(0)/n(L)$$

where n(0) is the refractive index of the medium around the filter element, n(L) the refractive index of the low refractive index layer L, n(H) the refractive index of the high refractive index layer H, t(L) the physical thickness of the low refractive index layers L as a whole, and t(H) the physical thickness of the high refractive index layers H as a whole. Also, θ is the angle formed between the incident light ray and the normal to the entrance surface at the entrance point of the incident light entering the entrance surface of the multilayer reflection film (FIG. 8).

A(λ) is a coefficient changing depending on the wavelength λ of the incident light obtained by extracting the experimentally-determined transmission loss of the filter element attributable to the axial shift and multiplying the particular transmission loss by a constant into a non-dimensional value. Assume that the filter element is a wavelength select filter and transmits at least three types of light having the wavelengths λ of 1300 nm, 1480 nm and 1500 nm while reflecting the light having the wavelength λ of 1550 nm, it is generally understood that the polarized wave in the direction perpendicular to the normal to the entrance surface of the filter element at the entrance point of the incident light and the plane containing the direction of incidence is defined as the S-polarized wave, and that the polarized wave orthogonal to the S-polarized wave as the P-polarized wave. Thus, the coefficient A(λ) dependent on the wavelength λ of the incident light is given as:

0.066 to 0.075 for the S-polarized wave having the incident light wavelength λ of 1300 nm, 0.40 to 0.50 for the S-polarized wave having the incident light wavelength λ of 1480 nm, 0.60 to 0.90 for the S-polarized wave having the incident light wavelength λ of 1500 nm, 0.060 to 0.090 for the P-polarized wave having the incident light wavelength λ of 1300 nm, 0.38 to 0.48 for the P-polarized wave having the incident light wavelength λ of 1480 nm, and 0.55 to 0.73 for the P-polarized wave having the incident light wavelength λ of 1500 nm.

In the process described below, the coefficient A(λ) is handled in such a manner that the value corresponding to the S-polarized wave is used when the S-polarized wave is emphasized as the exit light, while the value corresponding to the P-polarized value is used when stress is placed on the P-polarized wave as the exit light. On the other hand, in the case where both the S- and P-polarized waves are emphasized as exit light, as an example, simple arithmetic average of the values associated with the S-polarized wave and the P-polarized wave as well as the weighted average corresponding to the polarization condition may be used.

The conditions for this coefficient A(λ) can be used in a wide range of applications. Though not limited to this range, in order to reduce the cost of applications with different specifications required of the trunk system and intermediate devices in optical communication, fabrication is performed under the conditions set beforehand based on a narrow range for coefficient A(λ) rather than by selecting a highly sophisticated specification from the devices fabricated under the conditions for the coefficient A(λ) described above, can provide an optical multiplexer/demultiplexer superior in the loss and PDL characteristics at a lower cost.

The coefficient A(λ) for which the conditions are more relaxed for this purpose assumes the values in:

the range of 0.058 to 0.075 for the S-polarized wave having the wavelength λ of 1300 nm, the range of 0.40 to 0.53 for the S-polarized wave having the wavelength λ of 1480 nm, and the range of 0.60 to 0.91 for the S-polarized wave having the wavelength λ of 1500 nm.

For devices wherein certain specifications are more strictly required, the coefficient A(λ) assumes the values in:

the range of 0.067 to 0.069 for the S-polarized wave having the wavelength λ of 1300 nm, the range of 0.42 to 0.50 for the S-polarized wave having the wavelength λ of 1480 nm, and the range of 0.625 to 0.900 for the S-polarized wave having the wavelength λ of 1500 nm.

With regard to the conditions described above, in the case where a plurality of types of the optical signal having different wavelengths λ1, λ2, λ3, . . . , λp (p: natural number) are used throughout the filter element, the average value of A(λ1) to A(λp) is desirably used as the coefficient A(λ).

The coefficients A(λ) should be determined by the transmission characteristic of the filter element. Previously, these coefficients have never been managed with respect to the filter element. A study made by the inventor has revealed however, that as described below, the coefficient is considerably varied among the filter elements having substantially the same number of layers or the same thickness of the multilayer film.

Figure 11:
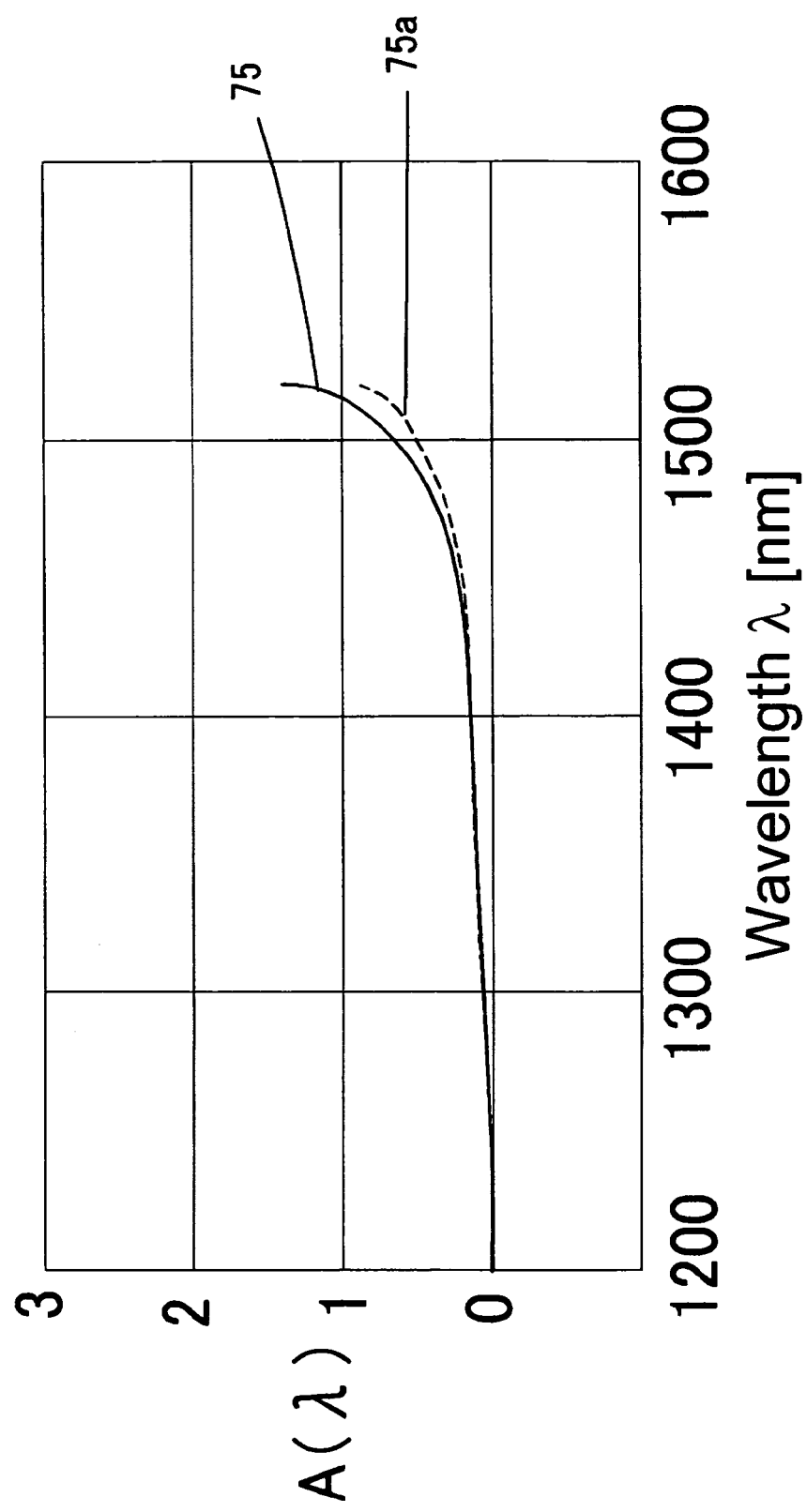
FIG. 11 shows a diagram for explaining an example of the coefficient A(λ).

The range of the values of the coefficient A(λ) described above is the conclusion obtained as the result of the study made from various angles. FIGS. 11 and 21 show an example of the actual variations with the filter element. FIGS. 11 to 21 are diagrams for explaining the variations of the coefficient A(λ) of the filter element. In all of these diagrams, the ordinate represents the coefficient A(λ) and the abscissa the wavelength λ of the incident light.

Figure 12:
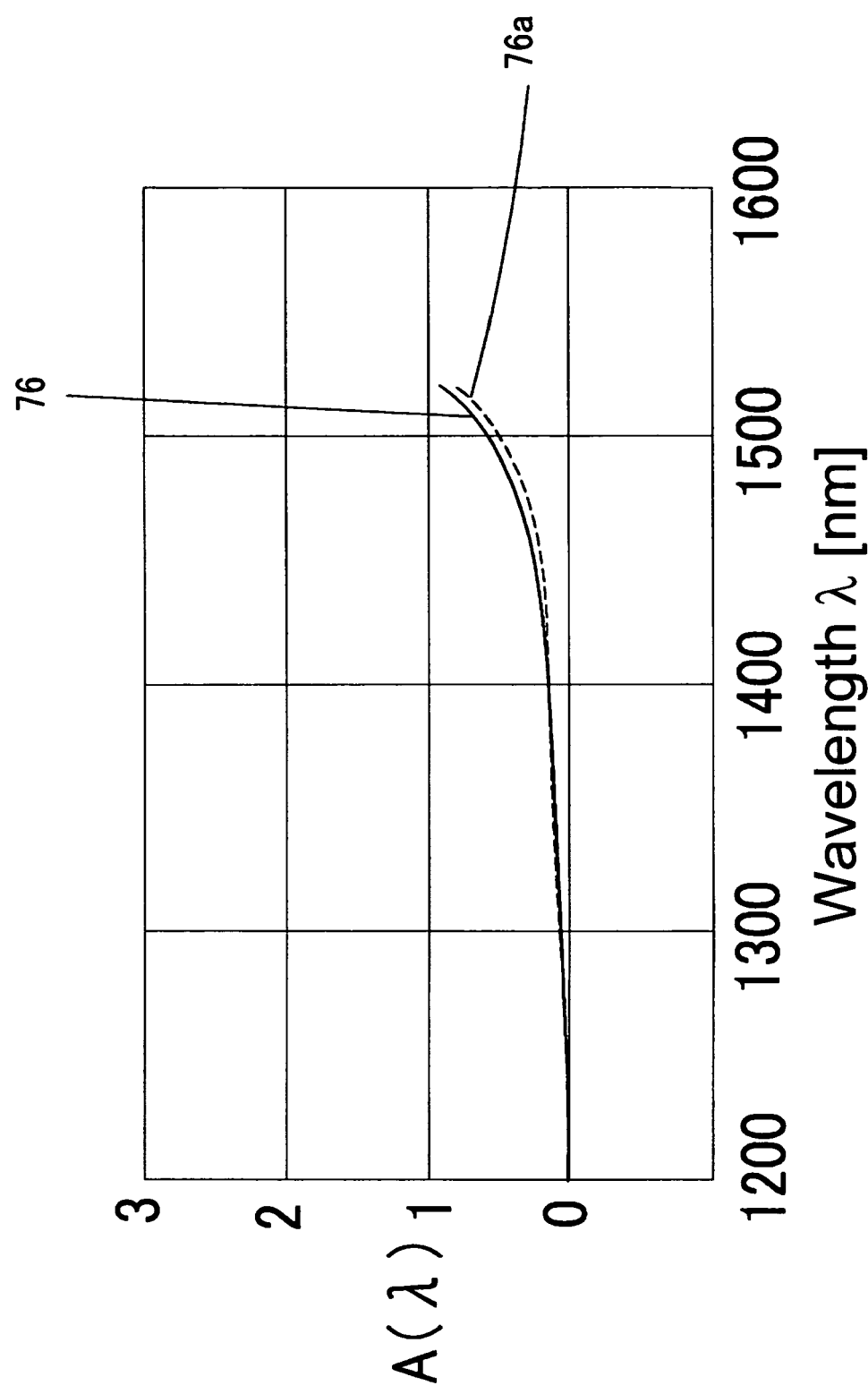
FIG. 12 shows a diagram for explaining an example of the coefficient A(λ).
Figure 13:
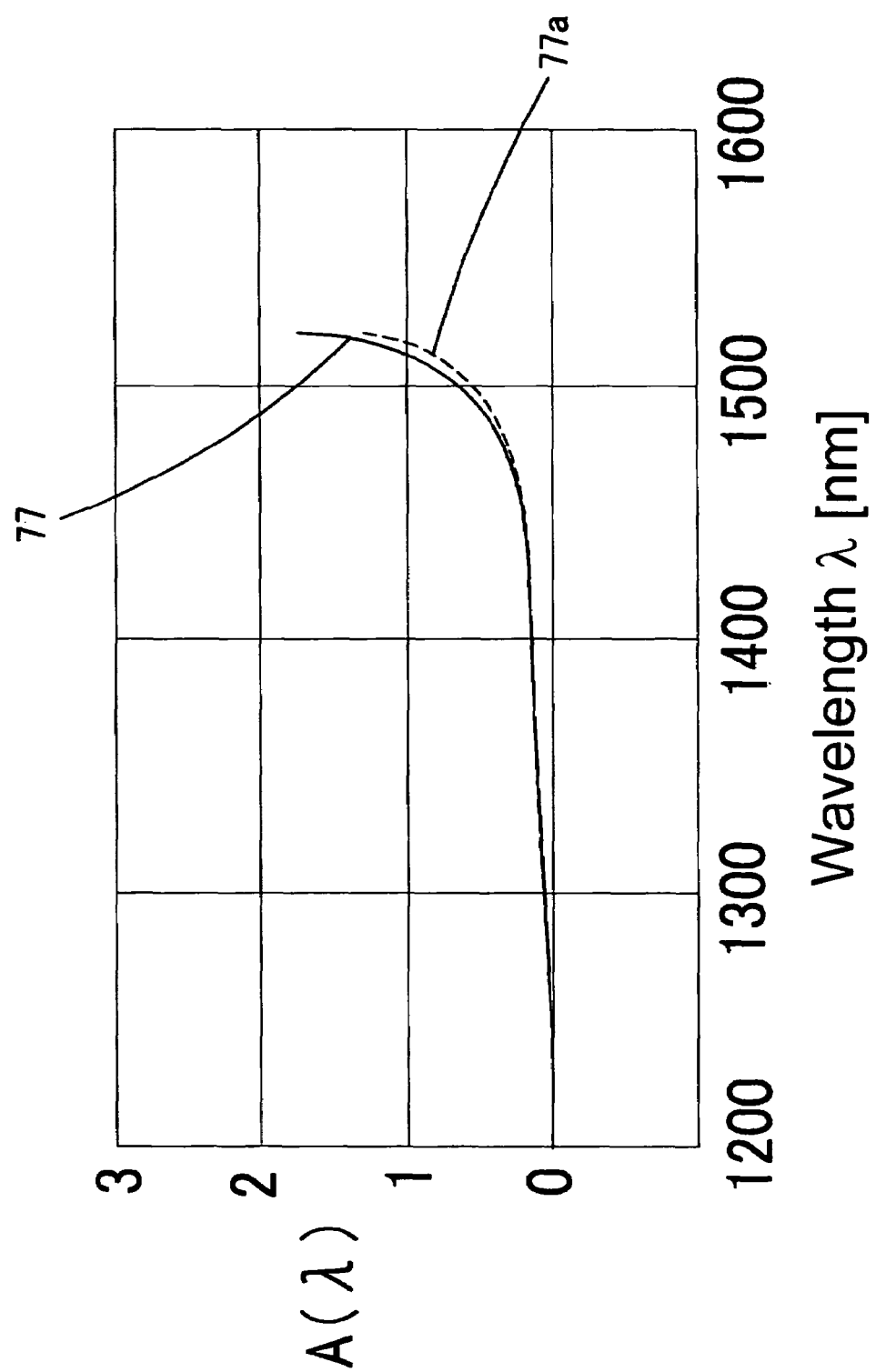
FIG. 13 shows a diagram for explaining an example of the coefficient A(λ).
Figure 14:
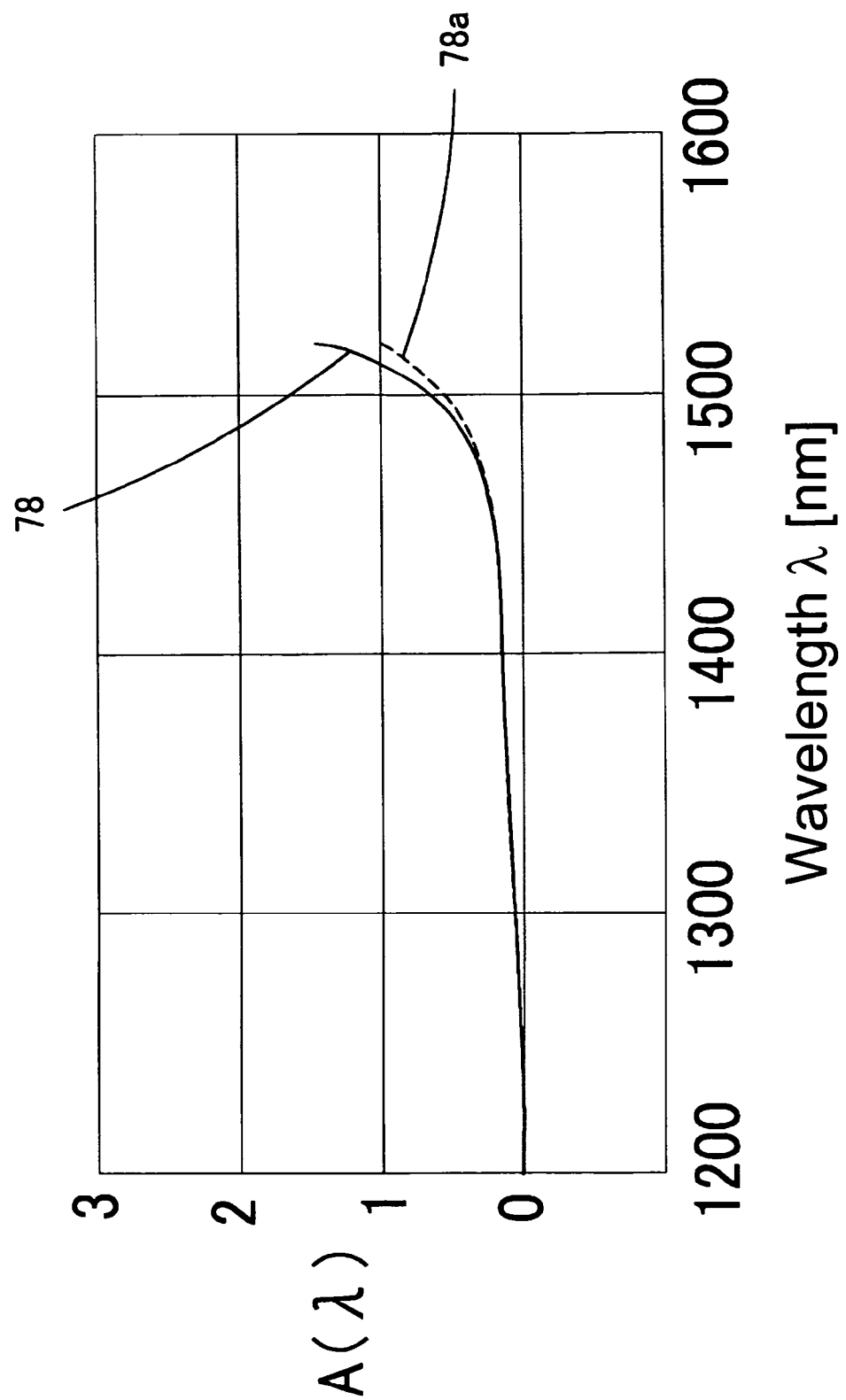
FIG. 14 shows a diagram for explaining an example of the coefficient A(λ).
Figure 15:
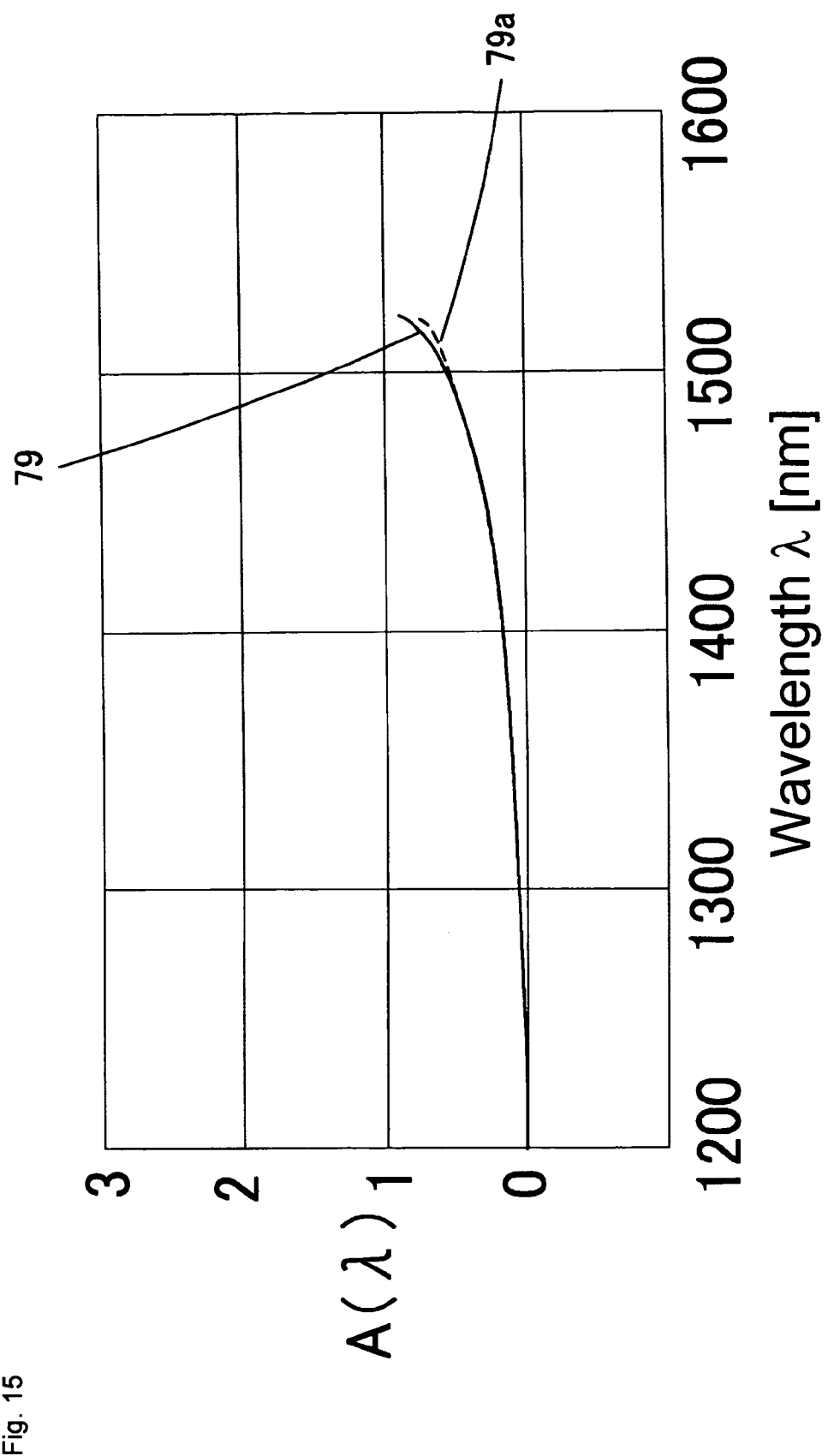
FIG. 15 shows a diagram for explaining an example of the coefficient A(λ).
Figure 16:
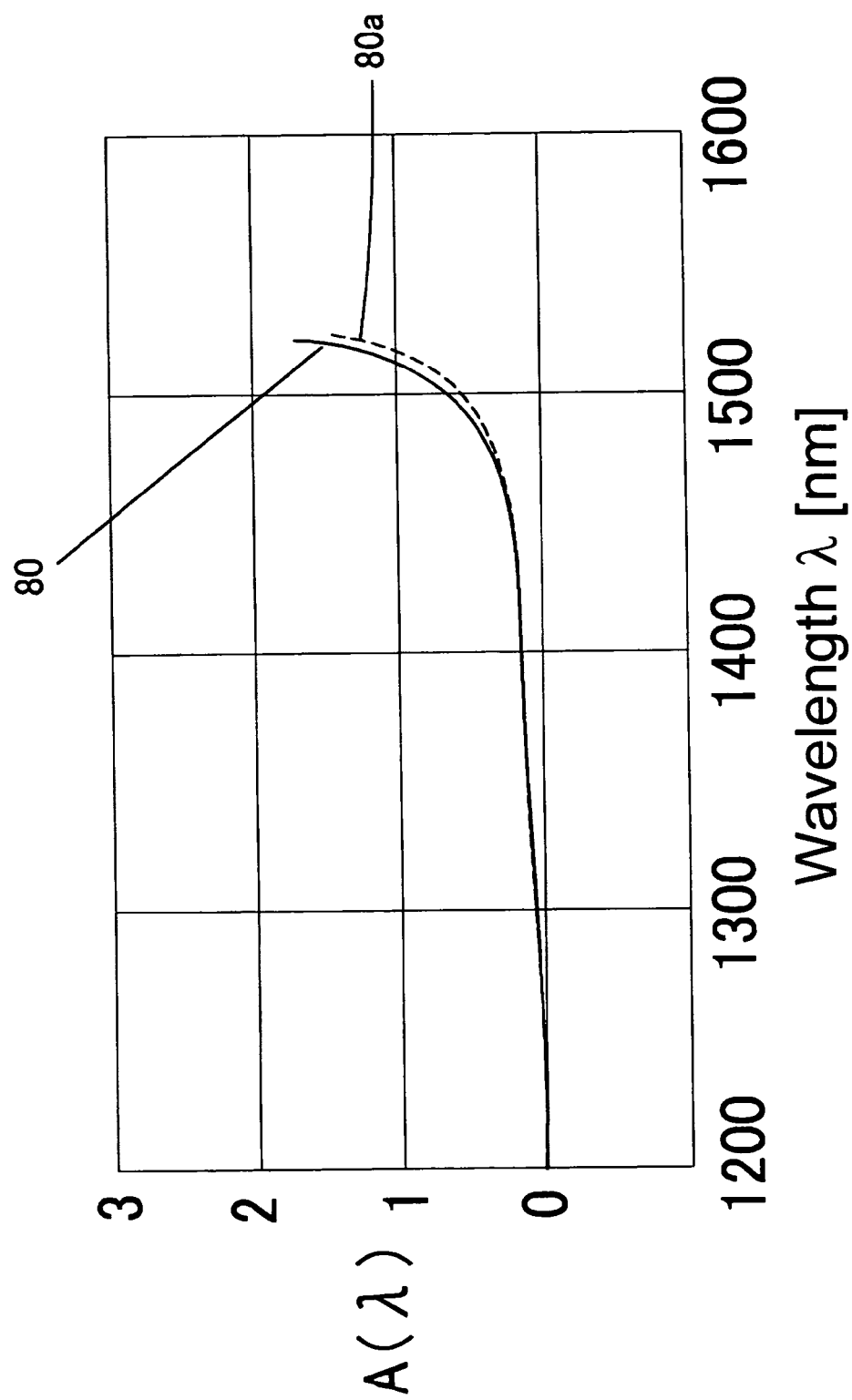
FIG. 16 shows a diagram for explaining an example of the coefficient A(λ).
Figure 17:
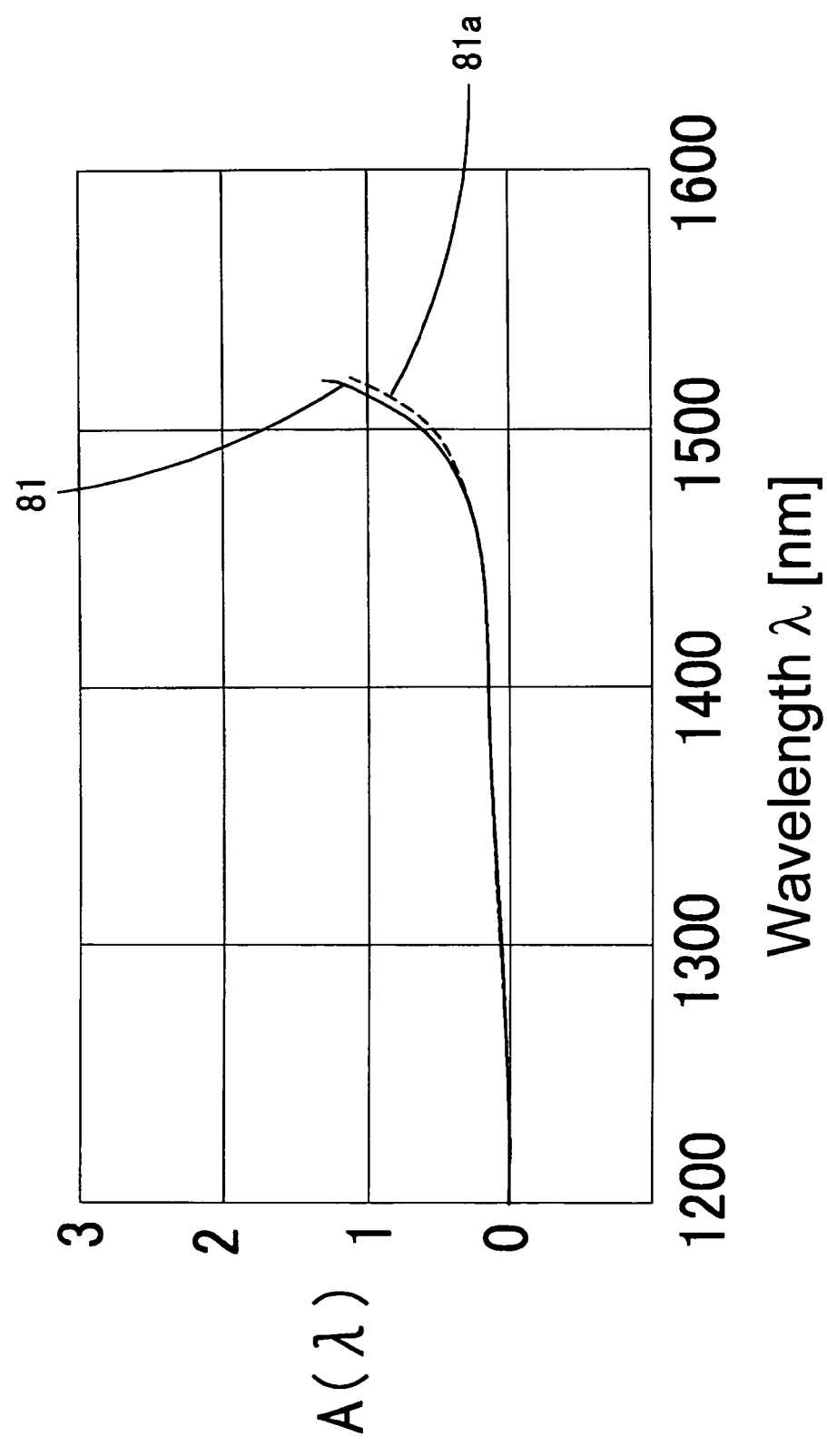
FIG. 17 shows a diagram for explaining an example of the coefficient A(λ).
Figure 18:
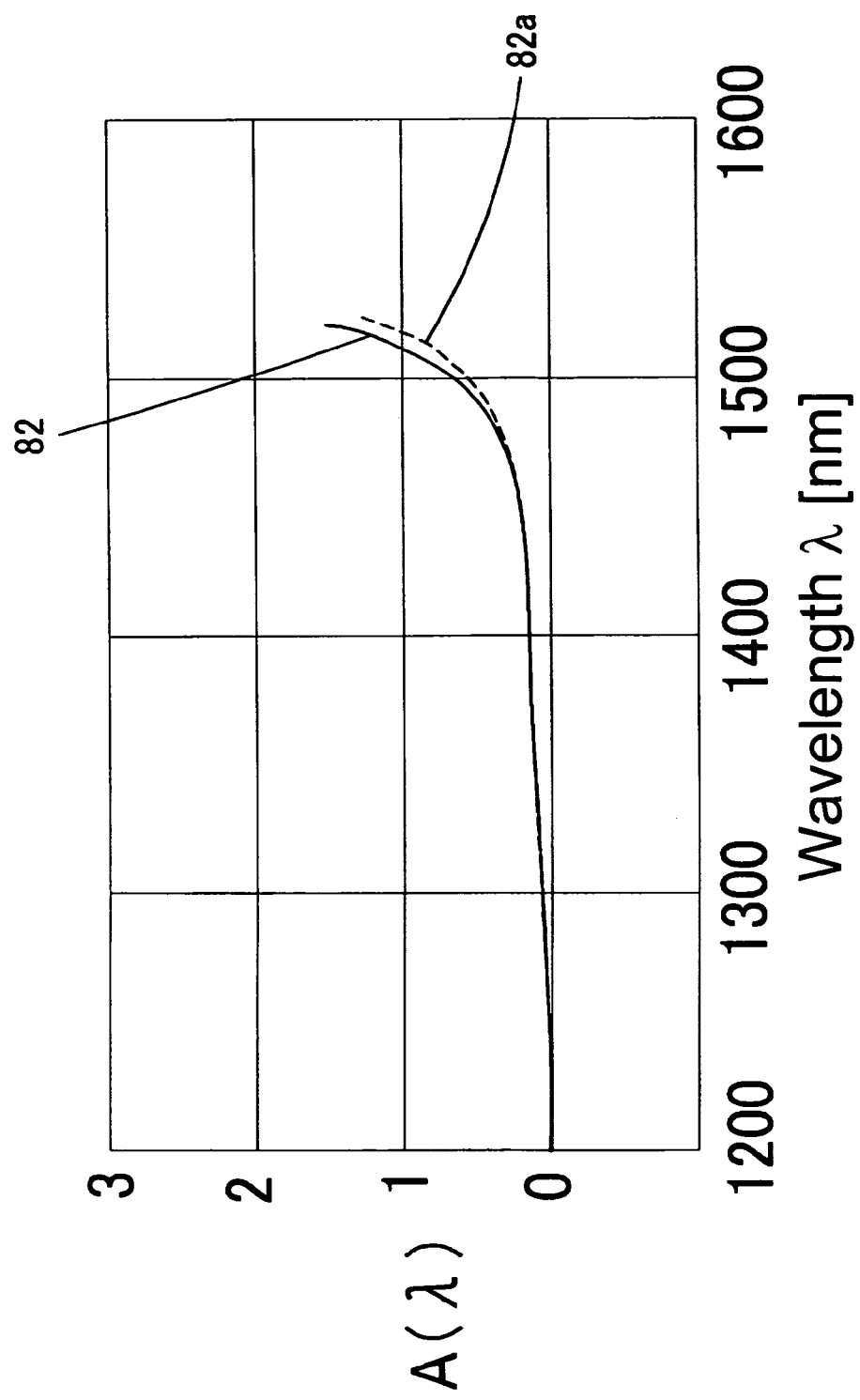
FIG. 18 shows a diagram for explaining an example of the coefficient A(λ).
Figure 19:
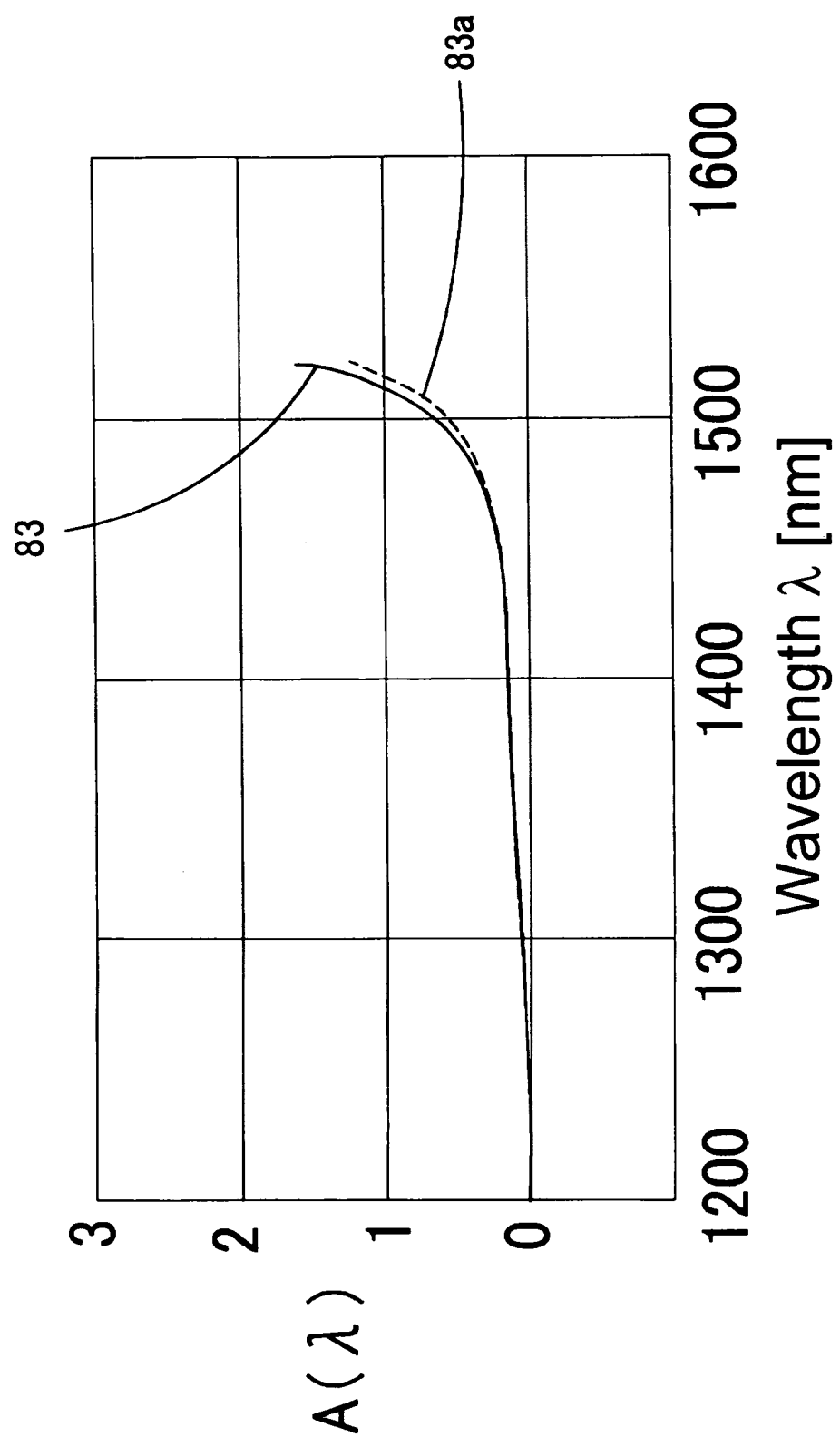
FIG. 19 shows a diagram for explaining an example of the coefficient A(λ).
Figure 20:
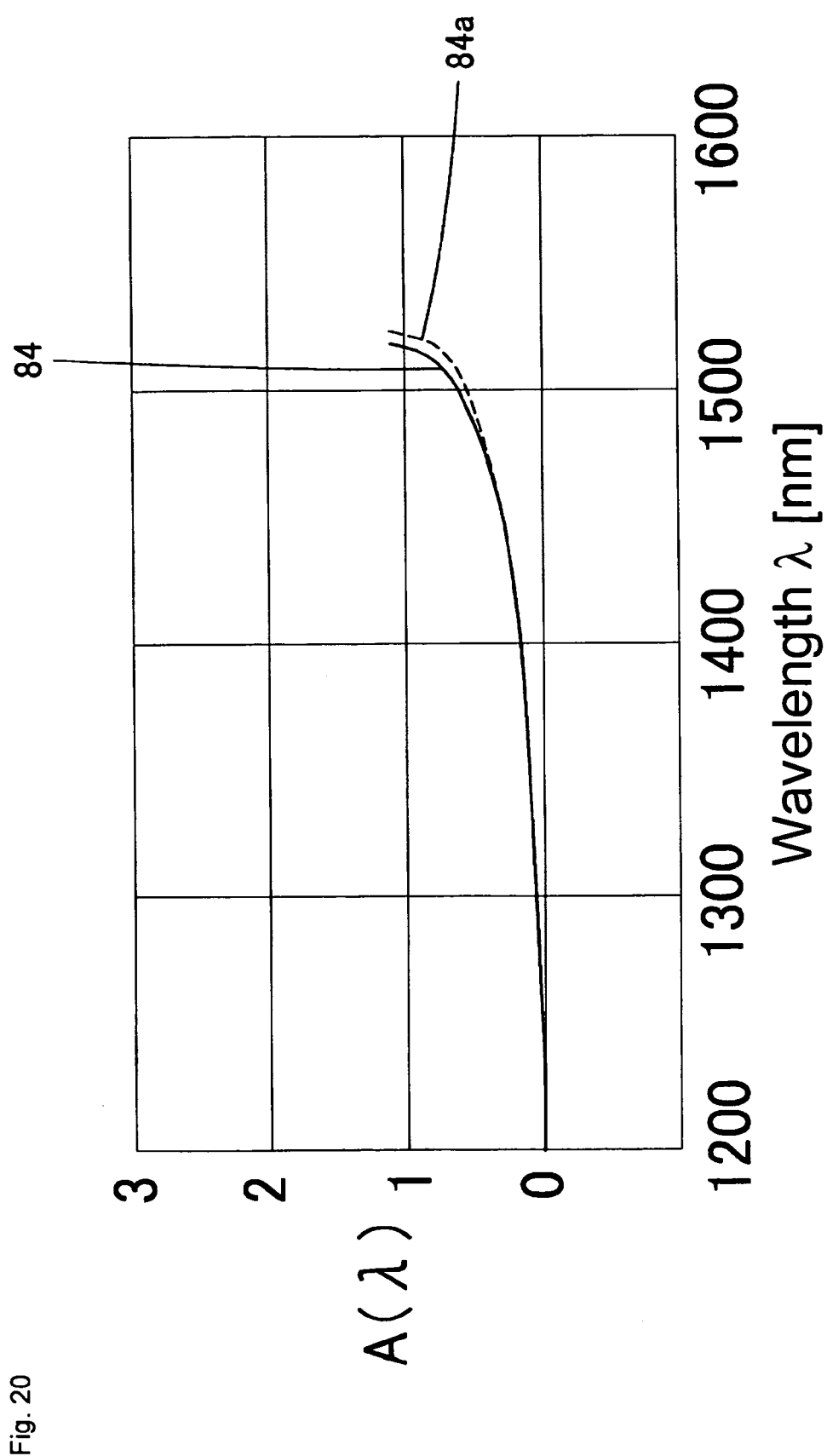
FIG. 20 shows a diagram for explaining an example of the coefficient A(λ).
Figure 21:
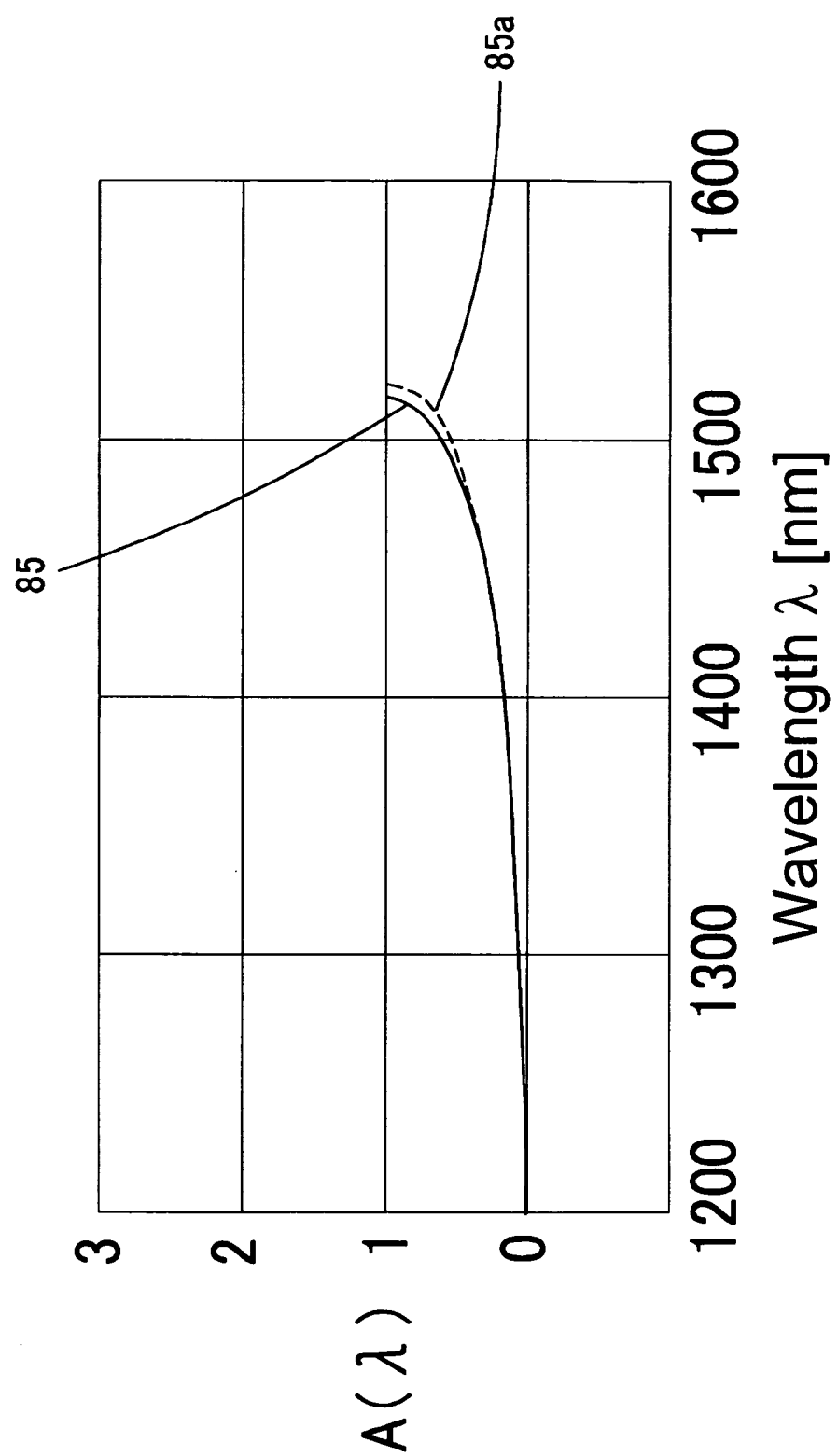
FIG. 21 shows a diagram for explaining an example of the coefficient A(λ).

In FIGS. 11 to 21, the curves designated by reference numerals 75 to 85 represent the relation between the coefficient A(λ) and the wavelength λ of the S-polarized wave, and the curves designated by numerals 75a to 85a the relation between the coefficient A(λ) and the wavelength λ of the P-polarized wave. The values of the coefficient A(λ) of the filter element for the S-polarized wave having the wavelength λ of 1300 nm of the incident light are determined from FIGS. 11 to 21, as follows:

A(λ) is 0.068 for the curve 75 of FIG. 11,
A(λ) is 0.059 for the curve 76 of FIG. 12,
A(λ) is 0.099 for the curve 77 of FIG. 13,
A(λ) is 0.067 for the curve 78 of FIG. 14,
A(λ) is 0.066 for the curve 79 of FIG. 15,
A(λ) is 0.105 for the curve 80 of FIG. 16,
A(λ) is 0.068 for the curve 81 of FIG. 17,
A(λ) is 0.069 for the curve 82 of FIG. 18,
A(λ) is 0.071 for the curve 83 of FIG. 19,
A(λ) is 0.068 for the curve 84 of FIG. 20, and
A(λ) is 0.067 for the curve 85 of FIG. 21.

The values of the coefficient A(λ) of the filter element for the P-polarized wave having the wavelength λ of 1300 nm of the incident light are determined from FIGS. 11 to 21, as follows:

A(λ) is 0.063 for the curve 75a of FIG. 11,
A(λ) is 0.055 for the curve 76a of FIG. 12,
A(λ) is 0.091 for the curve 77a of FIG. 13,
A(λ) is 0.079 for the curve 78a of FIG. 14,
A(λ) is 0.078 for the curve 79a of FIG. 15,
A(λ) is 0.115 for the curve 80a of FIG. 16,
A(λ) is 0.084 for the curve 81a of FIG. 17,
A(λ) is 0.087 for the curve 82a of FIG. 18,
A(λ) is 0.091 for the curve 83a of FIG. 19,
A(λ) is 0.075 for the curve 84a of FIG. 20, and
A(λ) is 0.073 for the curve 85a of FIG. 21.

The values of the coefficient A(λ) of the filter element for the S-polarized wave having the wavelength λ of 1480 nm of the incident light are determined from FIGS. 11 to 21, as follows:

A(λ) is 0.435 for the curve 75 of FIG. 11,
A(λ) is 0.387 for the curve 76 of FIG. 12,
A(λ) is 0.537 for the curve 77 of FIG. 13,
A(λ) is 0.425 for the curve 78 of FIG. 14,
A(λ) is 0.396 for the curve 79 of FIG. 15,
A(λ) is 0.563 for the curve 80 of FIG. 16,
A(λ) is 0.454 for the curve 81 of FIG. 17,
A(λ) is 0.489 for the curve 82 of FIG. 18,
A(λ) is 0.535 for the curve 83 of FIG. 19,
A(λ) is 0.406 for the curve 84 of FIG. 20, and
A(λ) is 0.409 for the curve 85 of FIG. 21.

The values of the coefficient A(λ) of the filter element for the P-polarized wave having the wavelength λ of 1480 nm of the incident light are determined from FIGS. 11 to 21, as follows:

A(λ) is 0.385 for the curve 75a of FIG. 11,
A(λ) is 0.347 for the curve 76a of FIG. 12,
A(λ) is 0.468 for the curve 77a of FIG. 13,
A(λ) is 0.397 for the curve 78a of FIG. 14,
A(λ) is 0.377 for the curve 79a of FIG. 15,
A(λ) is 0.507 for the curve 80a of FIG. 16,
A(λ) is 0.424 for the curve 81a of FIG. 17,
A(λ) is 0.455 for the curve 82a of FIG. 18,
A(λ) is 0.492 for the curve 83a of FIG. 19,
A(λ) is 0.376 for the curve 84a of FIG. 20, and
A(λ) is 0.378 for the curve 85a of FIG. 21.

The values of the coefficient A(λ) of the filter element for the S-polarized wave having the wavelength λ of 1500 nm of the incident light are determined from FIGS. 11 to 21, as follows:
A(λ) is 0.677 for the curve 75 of FIG. 11,
A(λ) is 0.567 for the curve 76 of FIG. 12,
A(λ) is 0.872 for the curve 77 of FIG. 13,
A(λ) is 0.658 for the curve 78 of FIG. 14,
A(λ) is 0.534 for the curve 79 of FIG. 15,
A(λ) is 0.897 for the curve 80 of FIG. 16,
A(λ) is 0.738 for the curve 81 of FIG. 17,
A(λ) is 0.864 for the curve 82 of FIG. 18,
A(λ) is 1.094 for the curve 83 of FIG. 19,
A(λ) is 0.599 for the curve 84 of FIG. 20, and
A(λ) is 0.603 for the curve 85 of FIG. 21.

The values of the coefficient A(λ) of the filter element for the P-polarized wave having the wavelength λ of 1500 nm of the incident light are determined from FIGS. 11 to 21, as follows:
A(λ) is 0.575 for the curve 75a of FIG. 11,
A(λ) is 0.501 for the curve 76a of FIG. 12,
A(λ) is 0.733 for the curve 77a of FIG. 13,
A(λ) is 0.581 for the curve 78a of FIG. 14,
A(λ) is 0.491 for the curve 79a of FIG. 15,
A(λ) is 0.764 for the curve 80a of FIG. 16,
A(λ) is 0.640 for the curve 81a of FIG. 17,
A(λ) is 0.719 for the curve 82a of FIG. 18,
A(λ) is 0.850 for the curve 83a of FIG. 19,
A(λ) is 0.532 for the curve 84a of FIG. 20, and
A(λ) is 0.535 for the curve 85a of FIG. 21.

As an example, the filter element having the characteristics shown in FIG. 11 is explained below. Each filter element of which the characteristics are shown in FIGS. 11 to 21 was configured of a polyimide fluoride film (substrate) 5 µm thick on which 71 alternate low and high refractive index layers L and H are stacked to form a multilayer film. The multilayer film formed on the polyimide fluoride film 5 µm thick is easily handled in the production process.

The filter element having the characteristics shown in FIG. 11 was configured of a polyimide fluoride film as a substrate 5 µm thick on which high refractive index layers H of Ta2O5 (tantalum pentoxide) and low refractive index layers L of SiO2 (silicon dioxide) were stacked alternately to form a multilayer film. The design reference wavelength λc is set to 1805 nm, and 71 alternate low and high refractive index layers L and H were stacked in such a manner that the refractive indexes n(L) and n(H) of the low and high refractive index layers, respectively, alternately assumed the following values in the following order from the substrate side toward the surface:
1.19, 1.43, 0.73, 1.28, 1.04,
0.95, 1.11, 0.998, 1.02, 0.998,
1.02, 0.998, 1.02, 0.998, 1.02,
0.998, 1.02, 0.98, 1.02, 1.001,
1.001, 1.001, 1.001, 1.001, 1.001,
1.001, 1.001, 1.001, 1.001, 1.001,
1.001, 1.001, 1.001, 1.001, 1.001,
1.001, 1.001, 1.001, 1.001, 1.001,
1.001, 1.001, 1.001, 1.001, 1.001,
1.001, 1.001, 1.001, 1.001, 1.001,
1.001, 1.02, 0.98, 1.017, 1.001,
1.017, 1.001, 1.017, 1.001, 1.017,
1.001, 1.017, 1.001, 1.04, 1.03,
1.09, 0.92, 1.3, 0.79, 1.41, and
1.27

The physical thickness of the multilayer film (thickness of the multilayer film proper not including the substrate) is 18.14 µm. The filter element of FIGS. 12 to 21 were of a similar configuration, while the refractive index of each layer differs from that of the filter used in FIG. 11.

Figure 22:
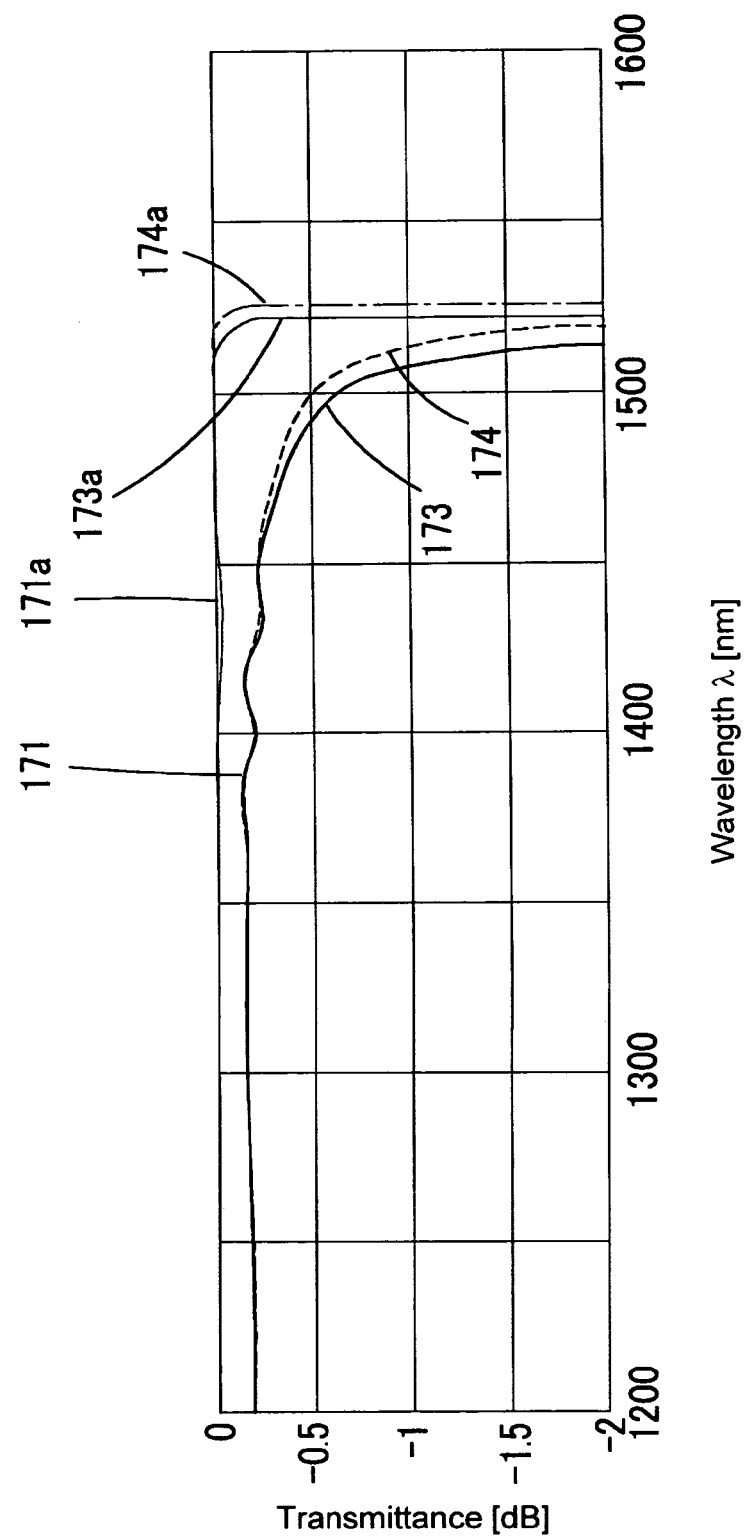
FIG. 22 shows a diagram for explaining the wavelength characteristic of a filter element having the characteristic shown in FIG. 11.
Figure 23:
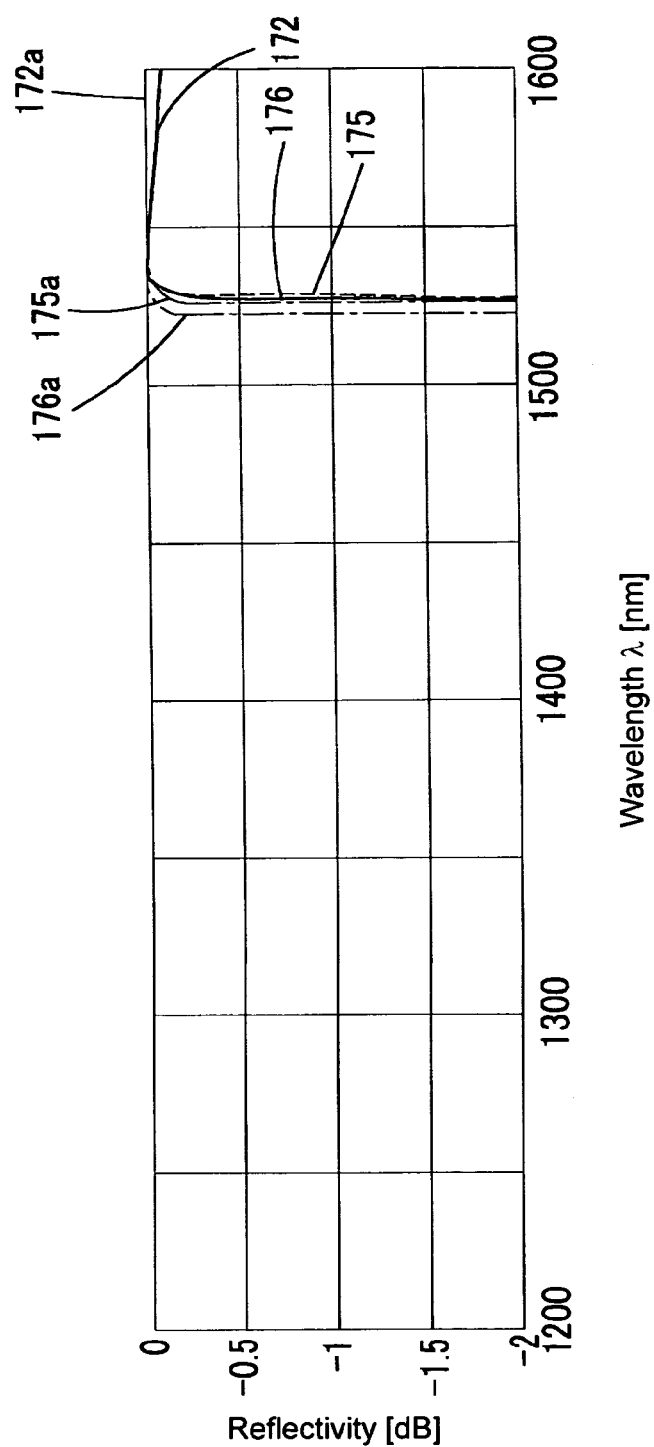
FIG. 23 shows a diagram for explaining the wavelength characteristic of a filter element having the characteristic shown in FIG. 11.

FIG. 22 is a diagram showing the transmittance-wavelength curves of the filter element having the characteristics shown in FIG. 11, wherein the ordinate represents the transmittance and the abscissa the wavelength λ of the incident light. FIG. 23 is a diagram showing the reflectivity-wavelength curves of the filter element having the characteristics shown in FIG. 11, wherein the ordinate represents the reflectivity and the abscissa the wavelength of the incident light. In FIGS. 22 and 23, the curves designated by numerals 171 to 176 show the characteristics of the scattered incident light in the absence of the collimator lens, and the curves designated by numerals 171a to 176a show the characteristics of the incident light collimated by the collimator lens. The curves designated by numerals 171, 171a show the transmittance characteristics (which appear to be a single line due to the superposition of the characteristic curves for the S-polarized wave and the P-polarized wave) in the transmission wavelength area. The curves designated by numerals 172, 172a show the reflection characteristics (which appear to be a single line due to the superposition of the characteristic curves for the S-polarized wave and the P-polarized wave) in the reflection wavelength area. The curves designated by numerals 173, 173a show the transmission characteristics of the S-polarized wave in the boundary portion between the transmission wavelength area and the reflection wavelength area. The curves designated by numerals 174, 174a show the transmission characteristics of the P-polarized wave in the boundary portion between the transmission wavelength area and the reflection wavelength area. The curves designated by numerals 175, 175a show the reflection characteristics of the S-polarized wave in the boundary portion between the transmission wavelength area and the reflection wavelength area. The curves designated by numerals 176, 176a show the transmission characteristics of the P-polarized wave in the boundary portion between the transmission wavelength area and the reflection wavelength area.

In the wavelength characteristic of the filter element shown in FIGS. 22, 23, the coefficient A(λ) has the characteristic included in the embodiment as shown in FIG. 11. Also, in the case where the light transmitted through the filter element has 1300 nm, 1480 nm, 1500 nm, and the reflected light is 1550 nm in wavelength, as indicated by the curves 171, 172, no harmful ripples appear, and both the loss characteristic and the PDL characteristic required of the filter element are satisfied suitably for use with the optical multiplexer/demultiplexer. The filter element shown in these examples reflects the light having the wavelength of 1550 nm with the transmittance of not more than 25 dB, and transmits the light having the wavelength of 1480 to 1500 nm with the loss of not more than 0.6 dB.

As described above, the curves 75a to 85a shown in FIGS. 11 to 21 show the characteristics of A(λ) against the P-polarized wave corresponding to the curves 75 to 85 for the S-polarized wave, i.e. the polarized wave in the direction parallel to the plane containing the direction of incidence and the normal to the entrance surface tilted with respect to the optical axis of the core of the filter element at the entrance point of the incident light. From this, the coefficient A(λ) can be determined for the incident light having the wavelength of other than 1300 nm, 1480 nm, 1500 nm and 1550 nm.

FIGS. 11 to 21 show an example of different filter elements, each having 71 alternate layers L and H are stacked thereby to form a multilayer film having the physical thickness d (hereinafter referred to simply as the thickness d) of about 18.1 μm on a substrate of polyimide fluoride having a 5 μm substrate. The values of the coefficient A(λ) for these filter elements are distributed over a wide range as described above.

FIG. 17 shows an example of the characteristics of A(λ) for different filter elements, each having 61 alternate low and high refractive index layers L and H are stacked thereby to form a multilayer film having the physical thickness d of about 15.6 μm on a similar substrate. FIG. 18 shows an example of the characteristics of A(λ) for different filter elements, each having 55 alternate low and high refractive index layers L and H are stacked thereby to form a multilayer film having the physical thickness d of about 14.1 μm on a similar substrate. FIG. 19 shows an example of different filter elements, in each of which 51 alternate low and high refractive index layers L and H are stacked thereby to form a multilayer film having the physical thickness d of about 13.1 μm on a similar substrate. FIG. 20 shows an example of different filter elements, in each of which 101 alternate low and high refractive index layers L and H are stacked thereby to form a multilayer film having the physical thickness d of about 25,8 μm on a similar substrate. FIG. 21 shows an example of different filter elements, in each of which 101 alternate low and high refractive index layers L and H are stacked thereby to form a multilayer film having the physical thickness d of about 29,3 μm on a similar substrate.

The filter elements having the same number of layers for the high refractive index layer H and the low refractive index layer L formed under the same conditions were prepared and the characteristics thereof were checked. Substantially the same result could be obtained as the data on the characteristics except for those related to the substrate. It is, therefore, understood that the value of the coefficient A(λ) is varied within a given range regardless of the same or different number of layers or the same or different thickness of the filter elements.

The manner of this variation was studied, and using the range described above with reference to the means for solving the problem as A(λ), the axial shift amount is set, and thus the multiplexer/demultiplexer with the filter element inserted therein is prepared. In this way, the loss characteristic and the PDL characteristic are remarkably improved.

From the viewpoint of the loss characteristic and the PDL characteristic, the filter element having 64 or more layers has produced an especially desirable result. Also, the use of the filter element free of the substrate described above can reduce the thickness of the filter insertion section, and produces a more desirable result. The range of the coefficient A(λ) for determining the axial shift amount of the optical multiplexer/demultiplexer has been described above.

(Fabrication Method)

Figure 24:
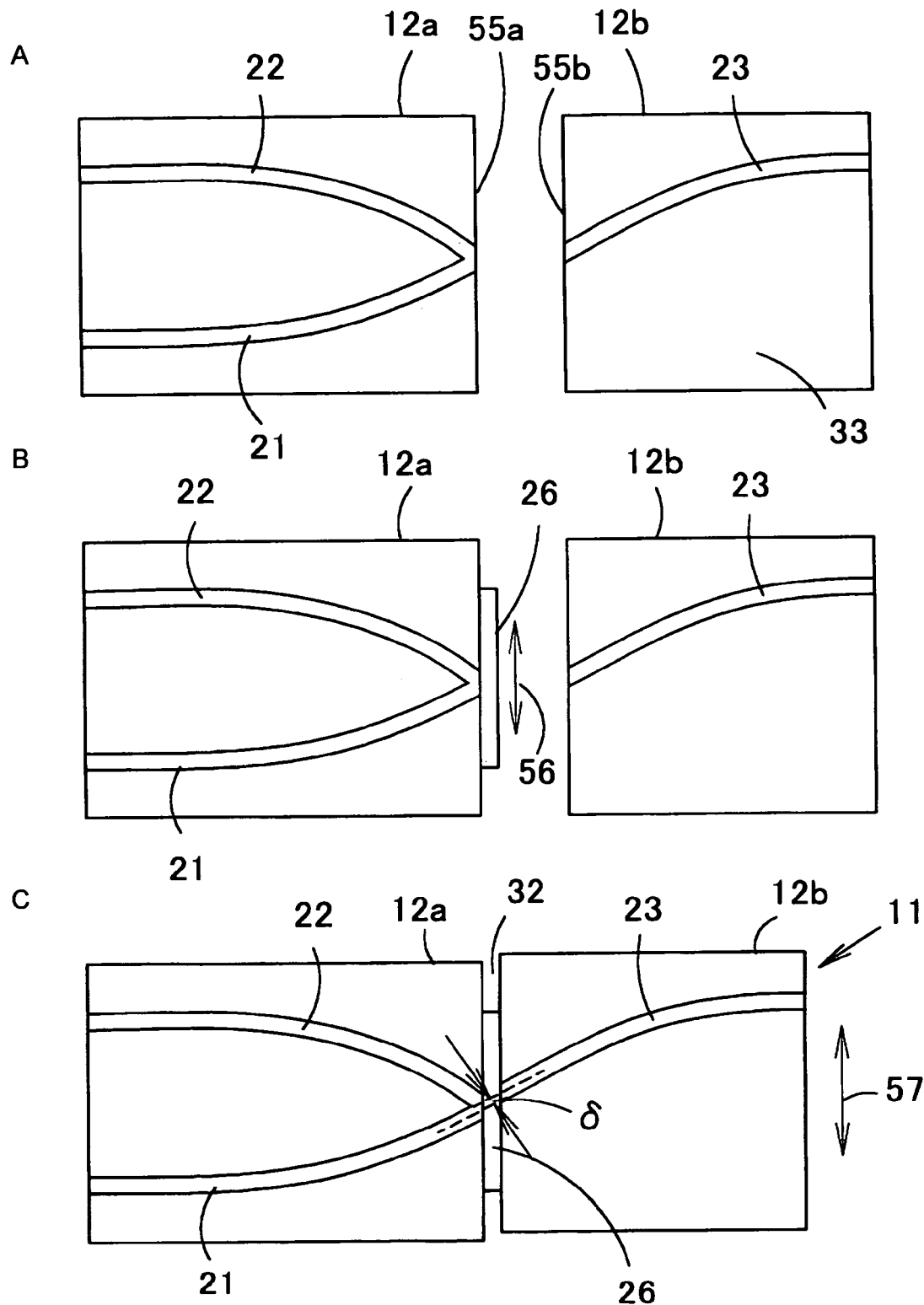
FIGS. 24a, 24b and 24c show diagrams for explaining the method of fabricating an optical multiplexer/demultiplexer according to an embodiment of the invention.

Next, a method of fabricating the optical multiplexer/demultiplexer 11 is explained. FIGS. 24(*a*), 24(*b*), 24(*c*) are diagrams for explaining a first fabrication method. In this method, as shown in FIG. 24(*a*), optical waveguides 12a, 12b are first formed separately from each other. In the optical waveguide 12a, two cores 21, 22 are formed in a clad 33. The ends of one of the cores 21, 22 are crossed and connected to each other. In the optical waveguide 12b, on the other hand, a core 23 is formed in the clad 33. Also, the coupling surfaces 55a, 55b of the optical waveguides 12a, 12b to be coupled to the filter element 26 are formed by taking the various optical conditions into consideration so that they can be used for entrance and exit of the signal light.

Next, a filter element 26 with the value of the coefficient A(λ) in the desirable range described above is prepared. The optical waveguide 12a and the filter element 26 are arranged independently of each other in the neighborhood of a predetermined position shown in FIG. 24(*b*) using for example, an appropriate positioning jig. Holding this state, light having the wavelength of 1550 nm is caused to enter one end of the core 22, exit from the other end of the core 22 and enter the filter element 26. The light reflected on the filter element 26 is caused to enter one end of the core 21 and exit from the other end of the core 23. While measuring the transmission characteristic of the light emitted from the other end of the core 23, the filter element 26 is moved appropriately in the direction crossing the arrow 56 in FIG. 24(*b*) and the relative positions of the optical waveguide 12a and the filter element 26 are determined in such a manner that the light exiting from the other end of the core 23 assumes a predetermined transmission characteristic.

Alternatively, in the process of this measurement, the light having the wavelength of 1550 nm may be caused to enter an end of the core 21, exit from the other end of the core 21 and enter the filter element 26. The light reflected from the filter element 26 may be caused to enter an end of the core 22, and the transmission characteristic of the light that exited from the other end of the core 22 may be measured to adjust the positions of the optical waveguide 12a and the filter element 26.

Next, the optical waveguide 12a and the filter element 26 now set in position are placed in opposed relation to the optical waveguide 12b, and using an appropriate positioning jig,etc, arranged in the neighborhood of a predetermined position as shown in FIG. 24(*c*). Then, the light having the wavelength of 1480 nm is caused to enter an end of the core 21, exit from the other end of the core 21 and enter and pass through the filter element 26. The light that is passed through the filter element 26 is caused to enter one end of the core 23, and the transmission characteristic of the light exiting from the other end of the core 23 is measured. The optical waveguide 12b is appropriately moved in the direction of arrow 57 or the direction crossing the arrow 57, and the relative positions of the optical waveguide 12b and the filter element 26 are determined in such a manner that the transmission characteristic of the light exiting from the other end of the core 23 assumes a predetermined state.

Next, the light having the wavelength of 1300 nm is caused to enter an end of the core 21, exit from the other and of the core 21 and enter and pass through the filter element 26. The light that is passed through the filter element 26 is caused to enter one end of the core 23, and the transmission characteristic of the light exiting from the other end of the core 23 is measured. The transmission characteristic of this exit light is measured thereby to confirm that the transmission loss of the incident light having the wavelength of 1480 nm is smaller than that of the incident light having the wavelength of 1300 nm. In the case where this confirmation is impossible, the transmission loss of the incident light having the wavelength of 1480 nm is improved by finely adjusting the relative positions of the optical waveguide 12b and the filter element 26.

Next, the light having the wavelength of 1500 nm is caused to enter an end of the core 21, exit from the other end of the core 21 and transmitted through the filter 26. The light thus transmitted is caused to enter an end of the core 23, and the transmission characteristic of the light that has exited from the other end of the core 23 is measured.

The transmission characteristics thus measured are compared with each other to confirm that the transmission characteristics of the incident light having the wavelengths of 1480 nm, 1300 nm and 1500 nm are in a predetermined range. Whenever required, the relative positions of the component elements are finely adjusted and the adhesive is hardened to fix the respective component elements as the optical multiplexer/demultiplexer 11 shown in FIG. 24(c).

Instead of actually transmitting the light and observing the transmission characteristic thereof as described above, the center axis of the core 21 of the optical waveguide 12a and the center axis of the core 23 of the optical waveguide 12b may be detected, and the relative positions of the optical waveguides 12a, 12b may be adjusted in such a manner that the axial shift amount between the center axes of the cores 21, 23 may be equal to the axial shift amount δ determined by calculations, simulation or experiments in advance.

Previously, the relative positions of the optical waveguides 12a and 12b were adjusted to secure the best transmission characteristics of the light having the wavelength of 1310 nm as signal light. Comparatively in this embodiment, the relative positions of the optical waveguide 12a and the filter element 26 are adjusted so that the transmission loss of the light having the wavelength of 1480 nm is smaller than that of the light having the wavelength of 1300 nm. In this way, the optical multiplexer/demultiplexer 11 having a satisfactory transmission characteristic for the incident light having the wavelength of 1260 nm to 1360 nm and the incident light having the wavelength of 1480 nm to 1500 nm in the transmission wavelength area of the filter element 26 can be fabricated with a high yield, thereby remarkably reducing the production cost.

Figure 25:
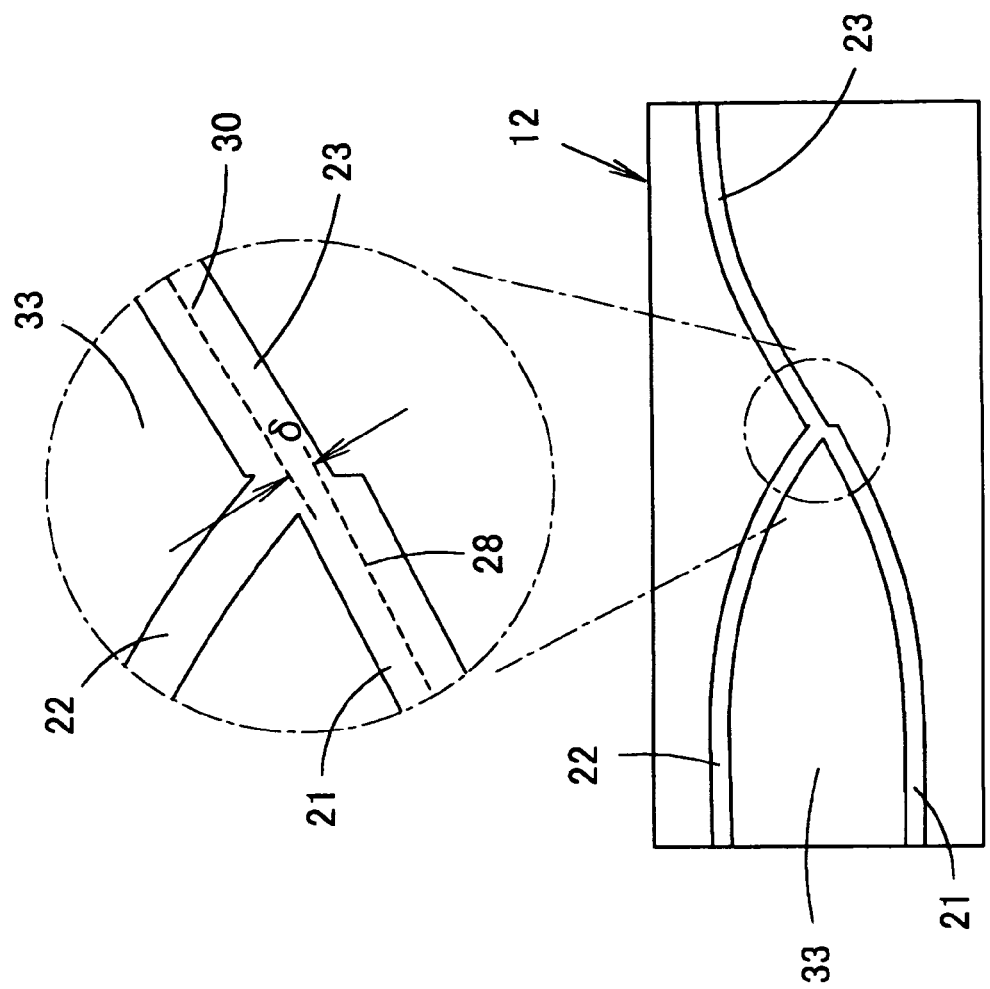
FIG. 25 shows a diagram for explaining another method of fabricating an optical multiplexer/demultiplexer according to an embodiment of the invention.
Figure 26:
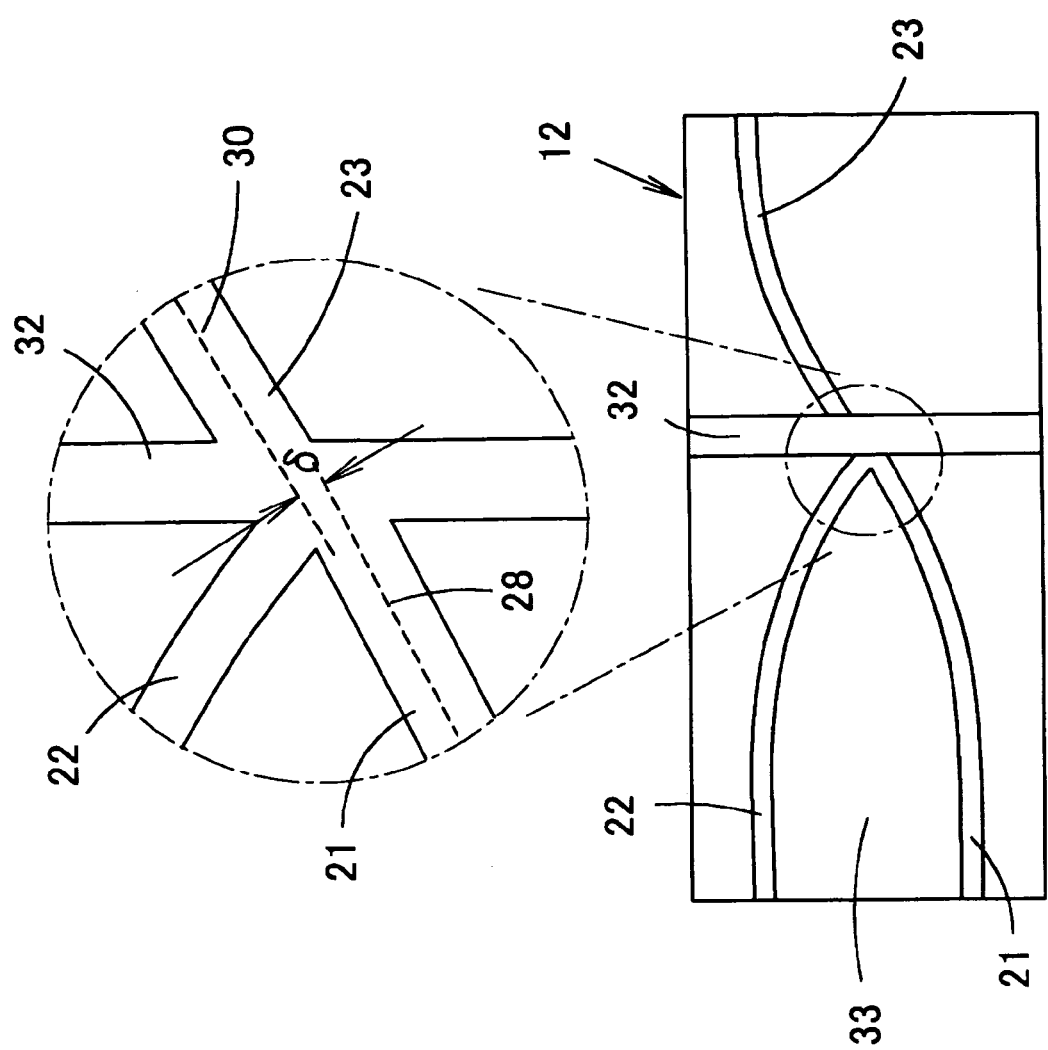
FIG. 26 shows a diagram for explaining the steps following the steps shown in FIG. 25.
Figure 27:
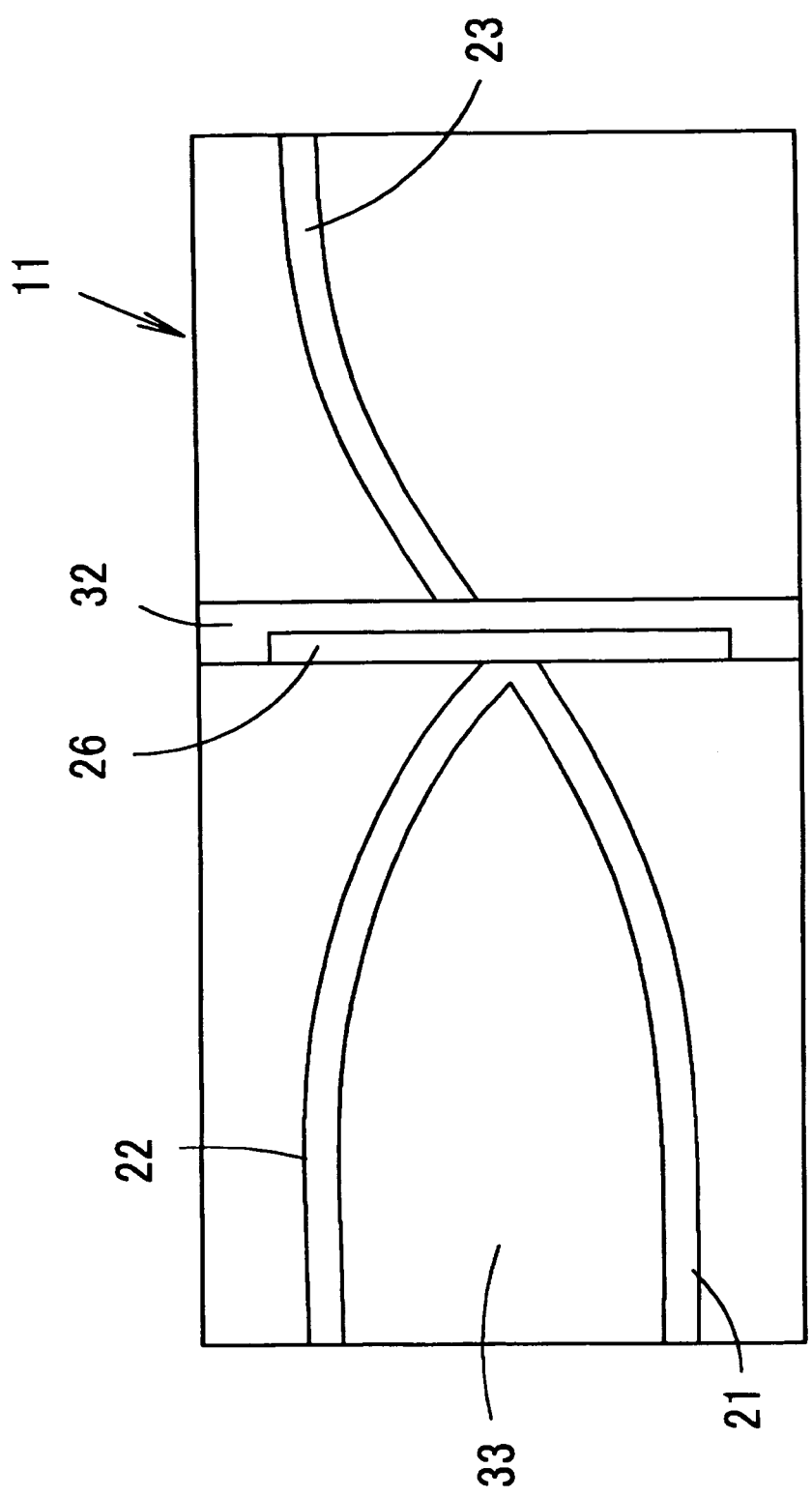
FIG. 27 shows a diagram for explaining the steps following the steps shown in FIG. 26.

FIGS. 25 to 27 are diagrams for explaining another method of fabricating the optical multiplexer/demultiplexer 11. In this fabrication method, an optical waveguide 12 with three cores 21, 22, 23 buried in a clad 33 are formed. In the process, an operating wavelength is assumed and the optimum axial shift amount δ is calculated in advance in the manner described above. As shown in FIG. 25, a die is designed so that the center line 28 of the core 21 and the center line 30 of the core 23 have an optimum axial shift amount δ, and using this die, the optical waveguide 12 is formed. The optical waveguide 12 formed in this way, as shown in FIG. 25, has the optimum axial shift amount δ between the cores 21, 23.

Next, as shown in FIG. 26, a groove is cut in the optical waveguide 12 between the cores 21 and 23 using for example, a dicing saw thereby to form a filter insertion portion 32. As shown in FIG. 27, the filter element 26 is inserted into the filter insertion section 32 and fixed with adhesive. Thus, the optical multiplexer/demultiplexer 11 is fabricated.

According to this fabrication method, as long as the precision molding die is fabricated to secure the optimum axial shift amount δ, the optical multiplexer/demultiplexer 11 can be mass produced using this molding die, and unlike in the conventional fabrication method, the labor of adjusting the optical multiplexer/demultiplexers 11 one by one can be saved.

In should be noted here that in the case where the position at which the light input to and transmitted through the filter element exits from the multilayer film (or the multilayer film portion other than the substrate, if any, of the multilayer film) is greatly varied from one multilayer film to another even though the number of the layers making up and the thickness of the multilayer film are the same. The particular position is also dependent on the wavelength of the incident light. This has not been the subject of discussion in the past and paid no attention to in the design of previous optical multiplexer/demultiplexers.

Further it has been observed that the loss due to the axial shift of the transmitted light described above with reference to FIGS. 6 to 10 is crucial for the provision of an inexpensive optical multiplexer/demultiplexer having a satisfactory characteristic using the filter element. The study of the axial shift is especially important for the filter element having 64 or more layers.

In order to accurately and easily determine the relative positions of the filter element and the optical waveguide having a satisfactory transmission characteristic of the reflected light with minimum variations and to reduce the transmission loss of the transmitted light, the coefficient $A(\lambda)$, that is the exit position of the filter element depending on the wavelength is introduced, and the filter element is fabricated in such a manner as to secure the predetermined range of the coefficient $A(\lambda)$. Thus, using the filter element satisfying the two conditions described above, the loss characteristic and the PDL characteristic of the optical multiplexer/demultiplexer are remarkably improved.

Specifically, as described above, the filter element is a wavelength-selected multilayer film edge filter, and in the case where this filter element is used with the optical multiplexer/demultiplexer, the characteristics of the optical multiplexer/demultiplexer cannot be improved to the desired level unless the optical axis of the core opposed to the filter element is aligned with the beam axis of the exit light as far as possible. In one method to attain this purpose, the optical axis between the end surfaces of the two cores opposed to each other with the filter element therebetween is arranged in alignment with the exit light from the filter element. Variations of the multilayer film, however, would make it necessary to prepare a multiplicity of optical waveguides for insertion and find a suitable combination. Also, improper management of the position at which the light exits from the filter element would deteriorate the filter characteristics or reduce the production yield extremely.

In view of this, a method of managing the optical axis between the end surfaces of the two cores opposed to each other without sacrificing the yield and the filter characteristics is provided and a superior loss characteristic and PDL characteristic are realized utilizing the method.

As long as the coefficient $A(\lambda)$ satisfies the desirable range as described above, as indicated by the example shown in FIGS. 22, 23, the filter element having superior loss characteristic and PDL characteristic with the practically acceptable ripple conditions can be apparently fabricated. It is thus understood that the optical multiplexer/demultiplexer can be industrially implemented.

The optical multiplexer/demultiplexer can also be implemented by arranging the opposed cores in such a manner as to secure the axial shift amount δ expressed as $$\delta = A(\lambda) \cdot T \cdot \tan\theta$$

between the optical axes of the opposed cores (the axis of the beam exiting from one core and the axis of the beam incident to the other core). In the case where there are a plurality of wavelengths of the transmitted light, the average value of the coefficients $A(\lambda)$ corresponding to the particular wavelengths is desirably used. In such a case, the average coefficient may be determined as a weighted average of the loss and PDL for each wavelength.

In the example shown in FIGS. 11 to 21, an optical multiplexer/demultiplexer is used in which the transmission wavelength of the filter element is 1300 nm to 1500 nm and the light having the wavelength of 1300 nm, 1480 nm and 1500 nm are transmitted. In fabricating this optical multiplexer/demultiplexer, as shown by the data described above, the use of the wavelength of 1480 nm for the coefficient $A(\lambda)$ makes it possible to mass produce the optical multiplexer/demultiplexer having superior loss and PDL characteristics with high production yield.

In another method for fabricating the optical multiplexer/demultiplexer, a circuit configuration is determined by checking the axial shift amount δ based on the filter element satisfying the required filter circuit specification, and the structure of the optical multiplexer/demultiplexer making the best of the filter characteristic is determined.

Correct comparison of the loss and PDL characteristics of the optical multiplexer/demultiplexer with the latest data on the current situation based on the conventional technical concept is difficult. Nevertheless, comparison in terms of the average value in mass production shows an improvement of at least 50%.

Several examples of the optical multiplexer/demultiplexer and fabrication methods thereof are explained above. To facilitate discussion, several additional methods and embodiments are discussed below; insofar as these methods and embodiments make mention of the embodiments that have been disclosed above, a detailed discussion of them is not revisited.

Although this invention is explained above with reference to several examples, the invention is not limited only to these examples and includes various modifications. For example, the photoconductor may be an optical fiber. With regard to the utilization of the reflected light, unlike in the prior art according to which a given photoconductor is used each time by trials and errors, the position of the end surfaces of the photoconductor on the side of the reflected light can be accurately determined. Therefore, the yield as well as the characteristics can be remarkably improved, thereby making mass production possible.

(Comparison of Effects)

The optical multiplexer/demultiplexer is compared with a conventional one using the parameters described below.
Refractive index of medium around filter element: $n(0)=1.5$
Refractive index of low refractive index layer L: $n(L)=1.5$
Refractive index of high refractive index layer H: $n(H)=2.0$
Refractive index of filter element substrate: $n(Sub)=1.5$
Physical thickness of whole low refractive index layer L: $t(L)=6$ μm
Physical thickness of the whole high refractive index layer H: $t(H)=12$ μm
Filter element substrate thickness: $t(Sub)=5$ μm
Incident light angle to normal to filter element surface: $\theta=9°$ In a conventional optical multiplexer/demultiplexer, simple consideration of the refraction in the filter element according to Snell's law results in the axial shift d1 (FIG. 5) of −0.24 μm. On the other hand, the shift amount (d12-d11) (FIG. 8) in the design methods discussed above, is 1.15 μm. The negative (−) sign of the shift amount indicates the downward shift while the lack of a sign (+sign) indicates the upward shift in FIG. 5 or 8.

As a result, the transmission loss of the transmitted light having the wavelength of 1300 nm, 1480 nm and 1500 nm is as shown in FIG. 28. As understood from this result, the transmission loss of the transmitted light or especially the light having the wavelength of 1480 nm or more can be reduced.

It will thus be understood from the foregoing description that an inexpensive optical multiplexer/demultiplexer having very satisfactory loss and PD characteristics can be mass produced, thereby greatly contributing to development in the field of optical communications.

What is claimed is:

1. An optical multiplexer/demultiplexer comprising:
   a filter element for transmitting light in a transmission area; and
   at least one photoconductor arranged on each of two sides of the filter element;
   wherein first and second ones of the photoconductors are arranged in such a manner that light in the transmission area of the filter element is transmitted through the filter element from the first photoconductor to the second photoconductor;
   wherein the filter element includes a multilayer film in which a high refractive index layer comparatively high in refractive index and a low refractive index layer comparatively low in refractive index are stacked alternately with each other;
   wherein a thickness T of the filter element is defined as $$T = t(H) \cdot n(0)/n(H) + t(L) \cdot n(0)/n(L)$$

where $n(0)$ is the refractive index of a medium around the filter element, $n(L)$ the refractive index of the low refractive index layer, $t(L)$ the physical thickness of the low refractive index layer as a whole, $n(H)$ the refractive index of the high refractive index layer and $t(H)$ the physical thickness of the high refractive index layer as a whole; and
   wherein an optical axis of the first photoconductor and an optical axis of the second photoconductor are shifted by an axial shift amount δ defined as $$\delta = A(\lambda) \cdot T \cdot \tan\theta$$

where θ is the angle of light incident to the filter element is normal to an entrance surface of the filter element, and $A(\lambda)$ a coefficient changing with the wavelength λ of the light incident to the filter element.

2. The optical multiplexer/demultiplexer according to claim 1,
   wherein the filter element includes a multilayer film for transmitting at least light having wavelengths of 1300 nm, 1480 nm and 1500 nm, and for reflecting light having a wavelength of 1550 nm,
   wherein when a polarized wave in a direction perpendicular to the normal to the entrance surface of the filter element at an entrance point of the incident light and the plane containing the direction of incidence is a S-polarized wave and a polarized wave in a direction perpendicular to the S-polarized wave is a P-polarized wave, the coefficient A(λ) assumes a value of 0.066 to 0.075 for the S-polarized wave having the wavelength of 1300 nm of the incident light, 0.40 to 0.50 for the S-polarized wave having the wavelength of 1480 nm of the incident light, 0.60 to 0.90 for the S-polarized wave having the wavelength of 1500 nm of the incident light, 0.060 to 0.090 for the P-polarized wave having the wavelength of 1300 nm of the incident light, 0.38 to 0.48 for the P-polarized wave having the wavelength of 1480 nm of the incident light, and 0.55 to 0.73 for the P-polarized wave having the wavelength of 1500 nm of the incident light.

3. The optical multiplexer/demultiplexer according to claim 1,
wherein the coefficient A(λ) is associated with light having a wavelength of not less than 1480 nm.

4. The optical multiplexer/demultiplexer according to claim 1,
wherein when light having a plurality of wavelengths is propagated through the photoconductors, the average value of the coefficients A(λ1), A(λ2), A(λ3), . . . , A(λp) for the wavelengths λ1, λ2, λ3, . . . , λp (p: natural number of wavelengths), respectively, is used as the coefficient A(λ).

5. The optical multiplexer/demultiplexer according to claim 1,
wherein a first optical waveguide having the first photoconductor and a second optical waveguide having the second photoconductor are photoconductors independent of each other before assembly, and the two photoconductors are arranged on the two sides of the filter element and fixedly bonded with the filter element.

6. A manufacturing method of an optical multiplexer/demultiplexer that comprises a filter element inserted into a filter insertion section for transmitting light in a transmission area, at least two first photoconductors arranged on one side of the filter insertion section of an optical waveguide and at least one second photoconductor arranged on another side of the filter insertion section,
wherein the first and second photoconductors are arranged on the two sides of the filter insertion section in such a manner that the light in the transmission area of the filter element is transmitted through the filter element, the method comprising the steps of:
forming the first and second photoconductors in the optical waveguides in such a manner that a distance between the optical axis of at least one of the first photoconductors and the optical axis of at least one of the second photoconductors is equal to an axial shift amount δ; forming a groove for inserting the filter element, in the optical waveguide between the first and second photoconductors;
inserting the filter element into the groove; and
fixing the filter element in the groove with adhesive;
wherein the filter element includes a multilayer film for transmitting at least light having wavelengths of 1300 nm, 1480 nm and 1500 nm and reflecting the light having the wavelength of 1550 nm,
wherein when a polarized wave in the direction perpendicular to the normal to the entrance surface of the filter element at an entrance point of the incident light and the plane containing the direction of incidence is a S-polarized wave and a polarized wave in a direction perpendicular to the S-polarized wave is a P-polarized wave, the coefficient A(λ) changing with the wavelength λ of the light incident to the filter element assumes a value of 0.066 to 0.075 for the S-polarized wave having the wavelength of 1300 nm of the incident light, 0.40 to 0.50 for the S-polarized wave having the wavelength of 1480 nm of the incident light, 0.60 to 0.90 for the S-polarized wave having the wavelength of 1500 nm of the incident light, 0.060 to 0.090 for the P-polarized wave having the wavelength of 1300 nm of the incident light, 0.38 to 0.48 for the P-polarized wave having the wavelength of 1480 nm of the incident light, and 0.55 to 0.73 for the P-polarized wave having the wavelength of 1500 nm of the incident light, wherein the multilayer film is a stack of alternate layers including a high refractive index layer comparatively high in refractive index and a low refractive index layer comparatively low in refractive index, wherein the thickness T of the filter element is defined as $$T = t(H) \cdot n(0)/n(H) + t(L) \cdot n(0)/n(L)$$

where n(0) is the refractive index of a medium around the filter element, n(L) the refractive index of the low refractive index layer, t(L) the physical thickness of the low refractive index layer as a whole, n(H) the refractive index of the high refractive index layer and t(H) the physical thickness of the high refractive index layer as a whole, and wherein the axial shift amount δ between the optical axis of the first photoconductor and the optical axis of the second photoconductor is defined as $$\delta = A(\lambda) \cdot T \cdot \tan\theta$$

where θ is the angle of light incident to the filter element normal to the surface of the filter element.

7. A manufacturing method of an optical multiplexer/demultiplexer that comprises a filter element inserted into a filter insertion section for transmitting light in a transmission area, a first optical waveguide having at least two first photoconductors arranged on one side of the filter element and a second optical waveguide having at least one second photoconductor arranged on another side of the filter element,
wherein the photoconductors of the first optical waveguide and the photoconductor of the second optical waveguide are arranged in such a manner that the light in the transmission area of the filter element is transmitted between the photoconductors of the first optical waveguide and the photoconductor of the second optical waveguide through the filter element, the method comprising the steps of:
forming the first optical waveguide having at least two photoconductors;
forming the second optical waveguide having at least one photoconductor;
arranging the first and second optical waveguides on the two sides, respectively, of the filter element and making an adjustment in such a manner that a distance between the optical axis of at least one photoconductor of the first optical waveguide and the optical axis of at least one photoconductor of the second optical waveguide is equal to an axial shift amount δ; and
coupling the first and second optical waveguides after adjustment and the filter element to each other with an adhesive;
wherein the filter element includes a multilayer film for transmitting at least light having wavelengths of 1300 nm, 1480 nm and 1500 nm and reflecting the light having the wavelength of 1550 nm, wherein when a polarized wave in a direction perpendicular to the normal to the entrance surface of the filter element at an entrance point of the incident light and the plane containing the direction of incidence is a S-polarized wave and a polarized wave in the direction perpendicular to the S-polarized wave is a P-polarized wave, the coefficient $A(\lambda)$ changing with the wavelength $\lambda$ of the light incident to the filter element assumes a value of 0.066 to 0.075 for the S-polarized wave having the wavelength of 1300 nm of the incident light, 0.40 to 0.50 for the S-polarized wave having the wavelength of 1480 nm of the incident light, 0.60 to 0.90 for the S-polarized wave having the wavelength of 1500 nm of the incident light, 0.060 to 0.090 for the P-polarized wave having the wavelength of 1300 nm of the incident light, 0.38 to 0.48 for the P-polarized wave having the wavelength of 1480 nm of the incident light, and 0.55 to 0.73 for the P-polarized wave having the wavelength of 1500 nm of the incident light, wherein the multilayer film is a stack of layers alternating between a high refractive index layer comparatively high in refractive index and a low refractive index layer comparatively low in refractive index, wherein the thickness T of the filter element is defined as $$T = t(H) \cdot n(0)/n(H) + t(L) \cdot n(0)/n(L)$$

where $n(0)$ is the refractive index of the medium around the filter element, $n(L)$ the refractive index of the low refractive index layer, $t(L)$ the physical thickness of the low refractive index layer as a whole, $n(H)$ the refractive index of the high refractive index layer and $t(H)$ the physical thickness of the high refractive index layer as a whole, and wherein the axial shift amount $\delta$ between the optical axis of the first photoconductor and the optical axis of the second photoconductor is defined as $$\delta = A(\lambda) \cdot T \cdot \tan \theta \qquad (1)$$

where $\theta$ is the angle of light incident to the filter element to the normal to the surface of the filter element.

\* \* \* \* \*